US006563503B1

(12) United States Patent
Comair et al.

(10) Patent No.: US 6,563,503 B1
(45) Date of Patent: May 13, 2003

(54) OBJECT MODELING FOR COMPUTER SIMULATION AND ANIMATION

(75) Inventors: Claude Comair, Vancouver (CA); Prasanna Ghali, Vancouver (CA); Samir A. Samra, Vancouver (CA); Sun T. Fam, Vancouver (CA); Xin Li, Issaquah, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/382,819

(22) Filed: Aug. 25, 1999

Related U.S. Application Data

(60) Provisional application No. 60/133,045, filed on May 7, 1999.

(51) Int. Cl.⁷ .............................................. G06T 15/70
(52) U.S. Cl. ....................... 345/473; 345/474; 345/475; 345/861; 345/706
(58) Field of Search ................................. 345/473, 474, 345/475, 861, 709, 706

(56) References Cited

U.S. PATENT DOCUMENTS

| 4,378,118 A | 3/1983 | Leonardi, Jr. |
| 4,552,360 A | 11/1985 | Bromley et al. |

(List continued on next page.)

FOREIGN PATENT DOCUMENTS

| EP | 0 588 625 A1 | 3/1994 |
| GB | 2 092 796 A | 8/1982 |

OTHER PUBLICATIONS

Video, "The Motion Factory, Motivate–Intelligent–Digital Actor System," 1997.
Tevan, Dan, "Product Review, Motivate 1.1: It's About Character," *Game Developer*, 6 pages, Aug. 1998.

"Motivate 3D Game Development System," The Motion Factory, 2 pages, 1999.

"Motivate Seminars at E3!" The Motion Factory, Inc., 1 page, undated.

Epstein, Samuel Latt, "CAT–Collaborative Authoring Tool," *The SenseMedia Papers*, Sep. 15, 1996, 6 pages.

(List continued on next page.)

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

Generic, abstract, encapsulated, expandable and maintainable techniques for modeling and animating computer graphics display objects can be used in a variety of different computer applications and platforms including, for example, video games developed for inexpensive home 3D video game platforms. An abstract simulation entity definition for use in real time computer simulation and animation encapsulates both the physical and behavioral characteristics of a display object. The simulation entity provides a unique "genetic plan" containing abstract attributes that may be shared among objects. Each simulation entity has the knowledge or know-how of common operations, and the ability to communicate with other simulation entities. Two separate class hierarchies may be used to differentiate between abstract components and physical components of simulation entities: an entity class hierarchy may be used to specify data structures and methods for behavior and communication; and an object class hierarchy may be used to define geometry and animation information and functions. A simulation entity can possess more than one set of object information. This allows the entity to change form (e.g., from a tiger to a bird) or perform multi-functionality during its lifetime. The simulation entity construct allows for more accurate modeling of the real world, supporting automation of simulation software production, and distributed and/or remote processing.

39 Claims, 21 Drawing Sheets

U.S. PATENT DOCUMENTS

| | | |
|---|---|---|
| 4,569,526 A | 2/1986 | Hamilton |
| 4,613,134 A | 9/1986 | Tobin |
| 5,125,671 A | 6/1992 | Ueda et al. |
| 5,184,830 A | 2/1993 | Okada et al. |
| 5,261,041 A | 11/1993 | Susman |
| 5,356,151 A | 10/1994 | Abecassis |
| 5,359,510 A | 10/1994 | Sabaliauskas |
| 5,393,062 A | 2/1995 | Cember |
| 5,409,234 A | 4/1995 | Bechter |
| 5,485,600 A * | 1/1996 | Joseph et al. |
| 5,498,003 A | 3/1996 | Gechter |
| 5,664,998 A | 9/1997 | Seelig et al. |
| 5,672,131 A | 9/1997 | Osborne et al. |
| 5,680,533 A | 10/1997 | Yamato et al. |
| 5,704,837 A | 1/1998 | Iwasaki et al. |
| 5,710,894 A | 1/1998 | Maulsby et al. |
| 5,774,125 A | 6/1998 | Suzuoki et al. |
| 5,872,973 A | 2/1999 | Mitchell et al. |
| 6,009,458 A | 12/1999 | Hawkins et al. |
| 6,031,549 A | 2/2000 | Hayes-Roth |
| 6,057,859 A | 5/2000 | Handelman et al. |
| 6,071,191 A | 6/2000 | Takeda et al. |
| 6,072,496 A | 6/2000 | Guenter et al. |
| 6,098,059 A * | 8/2000 | Nordin |
| 6,141,019 A * | 10/2000 | Roseborough et al. |

OTHER PUBLICATIONS

Funge, John, "Making Them Behave, Cognitive Models for Computer Animation," a Ph.D. thesis, University of Toronto, 121 pages, 1998.

Funge, John et al., "Making Them Behave," 21 slides, www.cs.toronto.edu, undated.

Funge, John et al., "Making Them Behave," 1 page, undated.

Funge, John , "Cognitive Modeling for Computer Games and Animation," Microcomputer Research Lab, Intel Corporation, 2 pages, undated.

Funge, John, "Hardcore AI for the Computer Games of Tomorrow," Microcomputer Research Lab, Intel Corporation, Class #4044, 6 pages.

* cited by examiner

CCat State Machine:

| State | Action | ExitLogicExpression | NewState |
|---|---|---|---|
| CAT_SLEEP | gpActionCAT_SLEEP ( ) | catHungryLevel > 10.0<br>catSleepTime > 4.0<br>*anythingElse* | CAT_DIE<br>CAT_WAKE<br>CAT_SLEEP |
| CAT_WAKE | gpActionCAT_WAKE ( ) | catHungryLevel < 2.0<br>*anythingElse* | CAT_PLAY<br>CAT_HUNT |
| CAT_PLAY | gpActionCAT_PLAY ( ) | catPlaytime < 3.0<br>*anythingElse* | CAT_PLAY<br>CAT_SLEEP |
| CAT_HUNT | gpActionCAT_HUNT ( ) | catCaughtMouse == 1<br>catHuntTime < 4.0<br>*anythingElse* | CAT_EAT<br>CAT_HUNT<br>CAT_SLEEP |
| CAT_EAT | gpActionCAT_EAT ( ) | endOfAnimation<br>*anythingElse* | CAT_SLEEP<br>CAT_EAT |
| CAT_DIE | gpActionCAT_DIE ( ) | *anythingElse* | CAT_DIE |

Fig. 8A

CMouse State Machine:

| State | Action | ExitLogicExpression | NewState |
|---|---|---|---|
| MOUSE_SLEEP | gpActionMOUSE_SLEEP ( ) | mouseCaughtByCat<br>mouseSleepTime > 2.0<br>*anythingElse* | MOUSE_DIE<br>MOUSE_SLEEP<br>MOUSE_WAKE |
| MOUSE_WAKE | gpActionMOUSE_WAKE ( ) | mouseCaughtByCat<br>*anythingElse* | MOUSE_DIE<br>MOUSE_PLAY |
| MOUSE_PLAY | gpActionMOUSE_PLAY ( ) | mouseCaughtByCat<br>mousePlayTime < 3.0<br>*anythingElse* | MOUSE_DIE<br>MOUSE_PLAY<br>MOUSE_SLEEP |
| MOUSE_DIE | gpActionMOUSE_DIE ( ) | *anythingElse* | MOUSE_DIE |

Fig. 8B

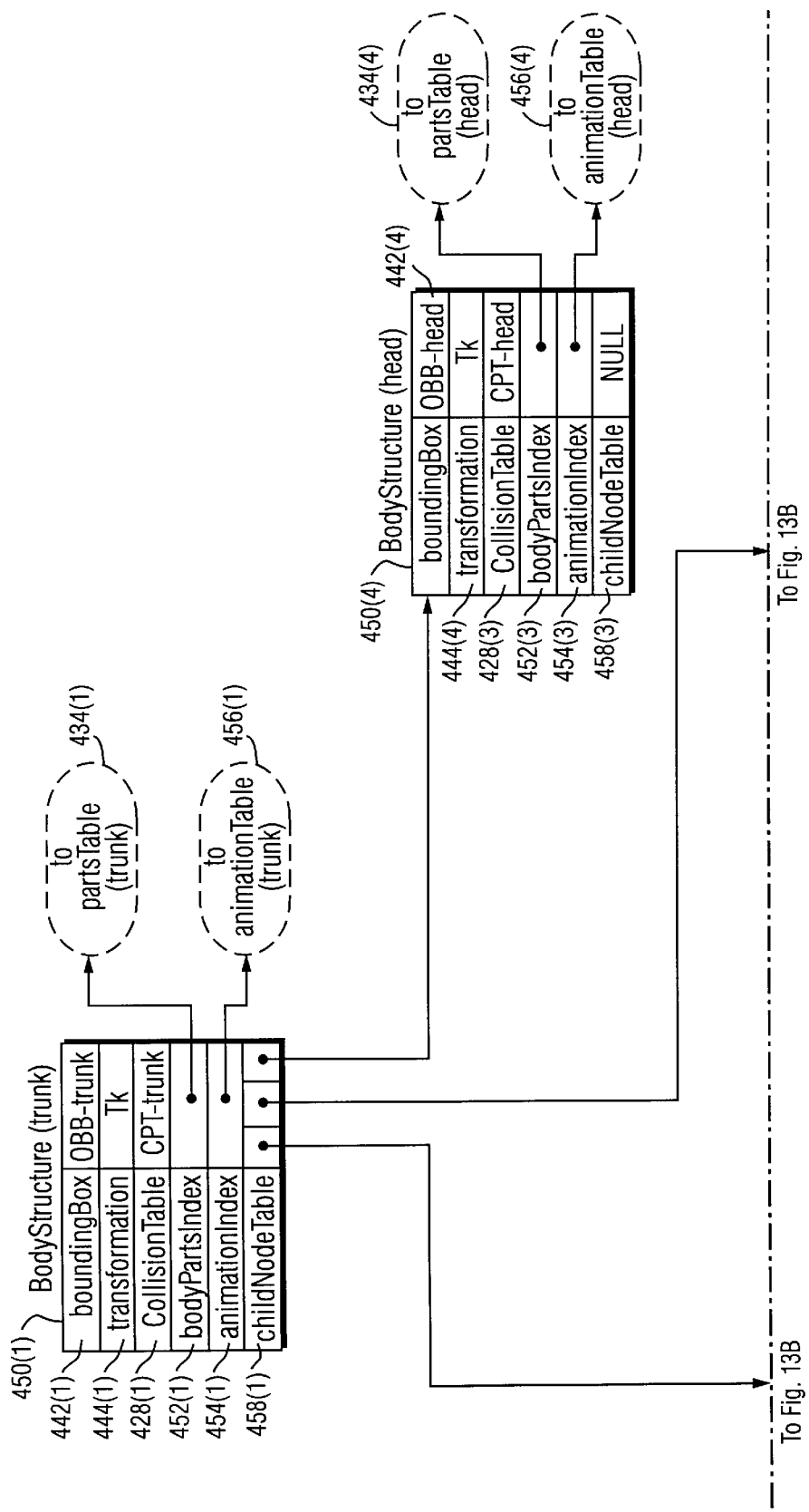
Fig. 13A: Example Animated Object Structure

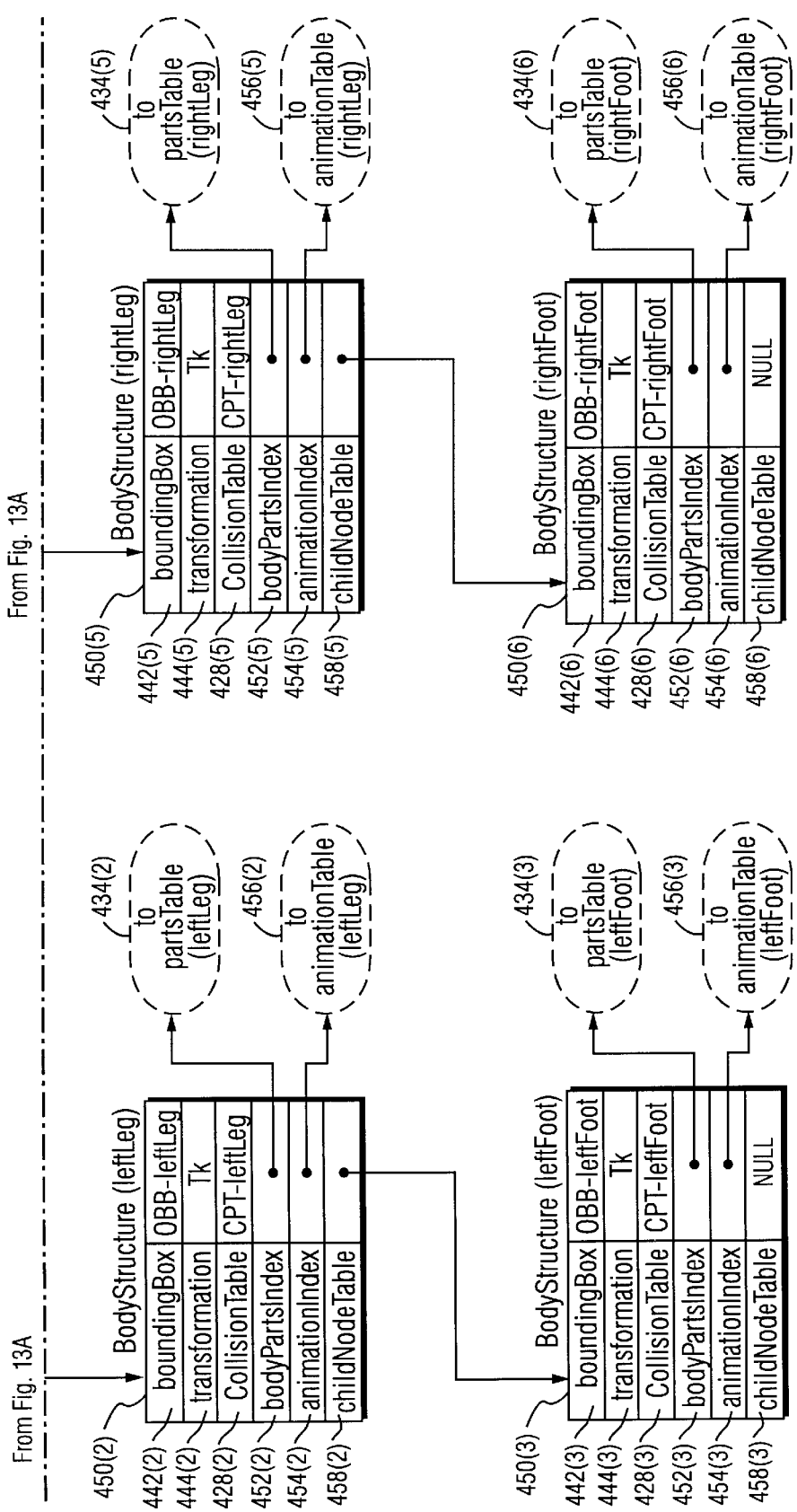
Fig. 13B: Example Animated Object Structure

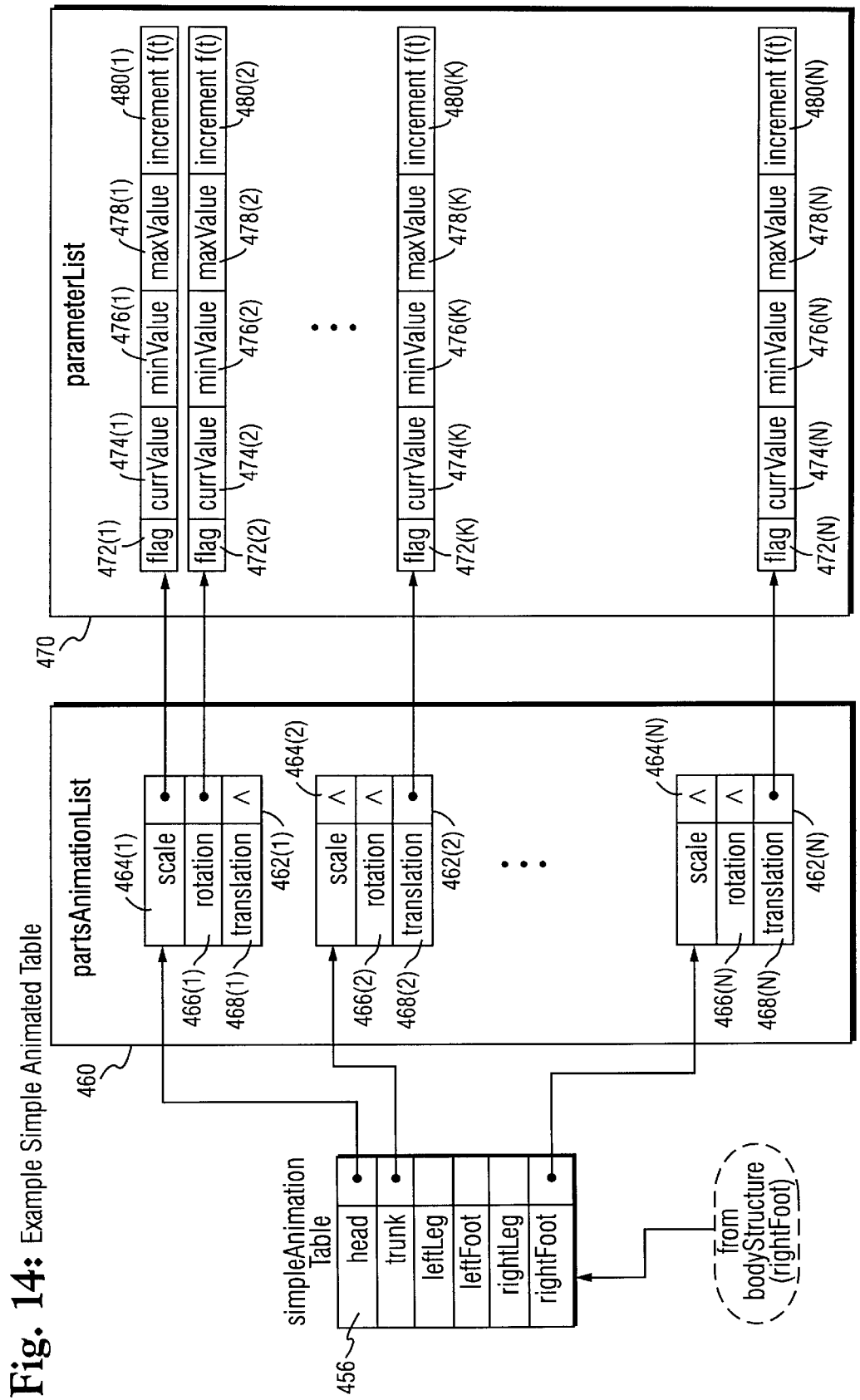
Fig. 14: Example Simple Animated Table

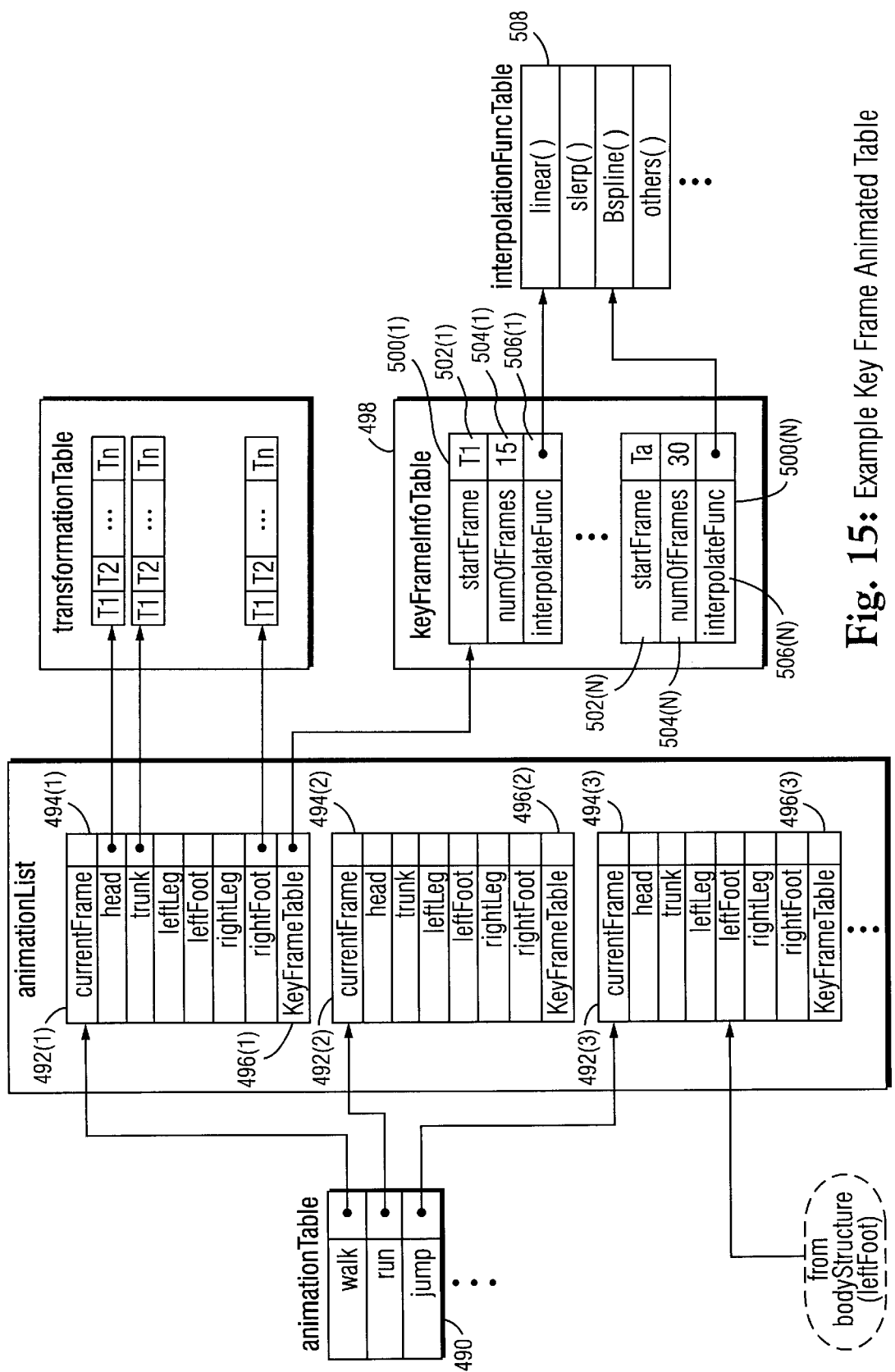
Fig. 15: Example Key Frame Animated Table

OBJECT MODELING FOR COMPUTER SIMULATION AND ANIMATION

CROSS-REFERENCE TO RELATED APPLICATION

The benefit of priority is claimed from U.S. provisional application no. 60/133,045 filed May 7, 1999.

FIELD OF THE INVENTION

The invention relates to computer graphics, and more particularly to modeling objects for use in computer simulation and animation. More specifically, the invention provides method and apparatus for modeling objects using a genetic plan that specifies, e.g., the behavior of the object and how it interacts with other objects.

BACKGROUND AND SUMMARY OF THE INVENTION

Many of us are familiar with the cartoons of the 1930's and 1940's. These entertaining animations were painstakingly hand-drawn by graphic artists as a series of still pictures that, when filmed and projected on the movie screen at high speed, provided the illusion of movement. This basic underlying technique of rapidly displaying a series of still frames continues to be used in modern animation, but the way the still frames are generated has been revolutionized by computer graphics. Now, 3D animation can be performed interactively in real time by computers. For example, the fast 3D processing provided by modern video game consoles such as the NINTENDO 64® can be used to generate realistic animation at high speed in interactive response to a player's manipulation of input devices such as hand-held controllers. Such advanced video graphics systems provide nearly cinematic quality and realism in real time while permitting all sorts of real and imaginary scenes and characters to be displayed with interactive animation.

One of the challenges to providing realistic interactive high speed 3-D computer animation relates to the manner in which the computer defines display objects. Computers define an object by storing data defining the object's characteristics. This characteristic-defining data is generally referred to as a model. Most computer graphics animation systems define objects in terms of what the object looks like (i.e., its shape or form). For example, many 3-D graphics systems model a 3D object by defining a number of polygons connected together to define three-dimensional surfaces.

Animated objects move, and therefore have dynamic characteristics in addition to static characteristics. For example, to realistically animate a ball, it is necessary to model the elasticity of the ball (i.e., how much it deforms when it strikes another object such as the ground, a wall or a tennis racket). It may also be necessary or desirable to specify how heavy the ball is (i.e., its mass) so that mathematics can be used to realistically determine its motion under the force of gravity and/or an impact with another surface. Other physical characteristics that are commonly modeled include degree of roughness, the effect of wind on an object, object acceleration in response to stimulus (i.e., how fast the object speed changes), and how the object behaves when it collides with various different types of other objects (for example, a golf ball in a golf game should bounce when it hits the green, become partially buried when it lands in a sand bunker, and sink when it strikes the surface of a pond).

While it is generally known to model the behavior of animated objects, many such prior modeling techniques are complicated, not particularly suited for efficient implementation on small scale systems such as home video game consoles, and have other disadvantages. For example, it can take a long time to prototype animations and games using prior techniques, and the prototyping process may require a high degree of computer programming skill and expertise. Therefore, further improvements are needed.

The present invention solves these problems by providing a general modeling technique for developing animations, simulation and video games. The tools and techniques provided in accordance with this invention can be used by graphic arts designers and animators having little or no computer programming expertise. They can substantially reduce the time required to prototype and develop complex video games, simulations and animations.

In accordance with one aspect provided in accordance with the present invention, an abstract, generic simulation entity definition for use in real time computer simulation and animation encapsulates both the physical and behavioral characteristics of a display object. The simulation entity construct provided in accordance with this invention allows for more accurate modeling of the real world, and supports automation of simulation software production. The present invention thus provides generic, abstract, encapsulated, expandable and maintainable techniques for modeling and animating computer graphics display objects, that allow for a high degree of component reuse from one application to another.

The simulation entity provides a unique "genetic plan" containing abstract attributes that may be shared among objects and that may be used to instantiate particular characters for particular animations, games and simulations. Each simulation entity has the knowledge or know-how of common operations, and the ability to communicate with other simulation entities.

In accordance with a further aspect provided by the present invention, two separate class hierarchies are used to differentiate between abstract components and physical components of simulation entities. An entity class hierarchy may be used to specify data structures and methods for behavior and communication. An object class hierarchy may be used to define geometry and animation information and functions. The use of hierarchical classes has the advantage of allowing subclasses be relatively easily derived that inherit properties.

In accordance with a further aspect provided by the present invention, a simulation entity can possess more than one set of object information. This allows the entity to change form (e.g., from a tiger to a bird) or perform multi-functionality during its lifetime.

In accordance with another aspect provided by this invention, a distributed control mechanism genetically builds behaviors into simulation entities. Each simulation entity contains a communication facility (i.e., in-port and out-port), and also its own genetic plan describing the way it reacts to stimuli from the outside world. Since each simulation entity is responsible for its own operations, it may be executed as a separate process (or, in some applications, in a different processor such as a remote computer). The invention supports loose-coupled applications and can be realized as a distributed system.

The abstract data structures/methods provided in accordance with the present invention are general enough to suit tool-kit and run-time software, and may be used to model all sorts of different simulation and animation including a variety of different video game objects (e.g., character, racing, puzzle, etc.) The present invention may provide a general-usage development tool that does not require advanced computer expertise to operate, and yet may be successfully used by artists to rapidly develop animations, games and simulations. The implementation can be used in a variety of different computer applications and platforms including, for example, video games developed for inexpensive home 3D video game platforms.

BRIEF DESCRIPTION OF THE DRAWINGS

These and other features and advantages provided in accordance with the present invention will be better and more completely understood by referring to the following detailed description of presently preferred example embodiments in conjunction with the drawings, of which:

FIGS. 7, 8A and 8B show example finite state machine genetic plan definition;

FIGS. 13A and 13B together show an example data structure representing an animated object;

FIG. 14 shows an example simple animation table;

FIG. 15 shows an example key frame animation table;

DETAILED DESCRIPTION OF PRESENTLY PREFERRED EXAMPLE EMBODIMENTS

Figure 1:
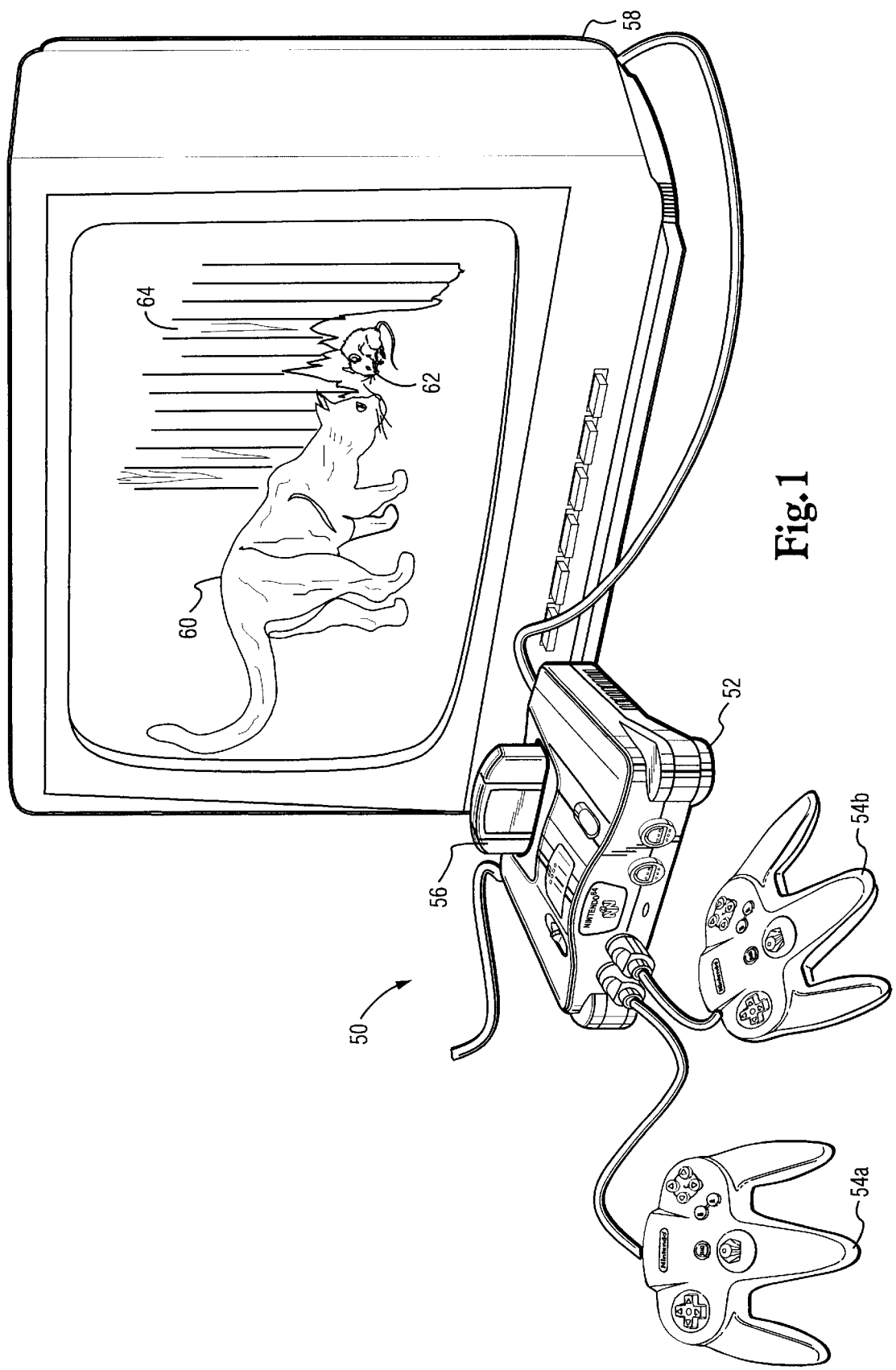
FIG. 1 shows an example interactive 3-D video game display system.

FIG. 1 shows an example 3-D real time computer animation system 50 that may be used to provide realistic interactive real time 3D simulation and animation in accordance with the present invention. The FIG. 1 example system 50 includes a NINTENDO 64® 3-D video game console 52 and associated hand controllers 54a, 54b. A cartridge 56, optical disk or other storage medium storing a software animation (video game) program is operatively connected to console 52. The console 52 is connected to a display device 58 such as a conventional home color television set or computer monitor. Console 52 includes a 3D graphics engine that can render 3D animation on display 58 in real time response to user manipulation of controllers 54a, 54b.

The software within cartridge 56 controls console 52 to display a sequence of animated video frames on display 58—in the particular example shown, depicting a realistic cat 60 and mouse 62 within a three-dimensional scene 64. Human players may operate hand controllers 54a, 54b to cause cat 60 and/or mouse 62 to move interactively in real time within scene 64. In accordance with the present invention, the software within game cartridge 56 models cat 60, mouse 62 and scene 64 using a simulation entity model including a unique genetic plan. The simulation entity model (which may be stored on storage medium 56) is used to model the various behavioral, appearance and other characteristics of cat 60, mouse 62 and scene 64 for purposes of real time computer simulation.

Overall Structure and Operation of Entities

Figure 2:
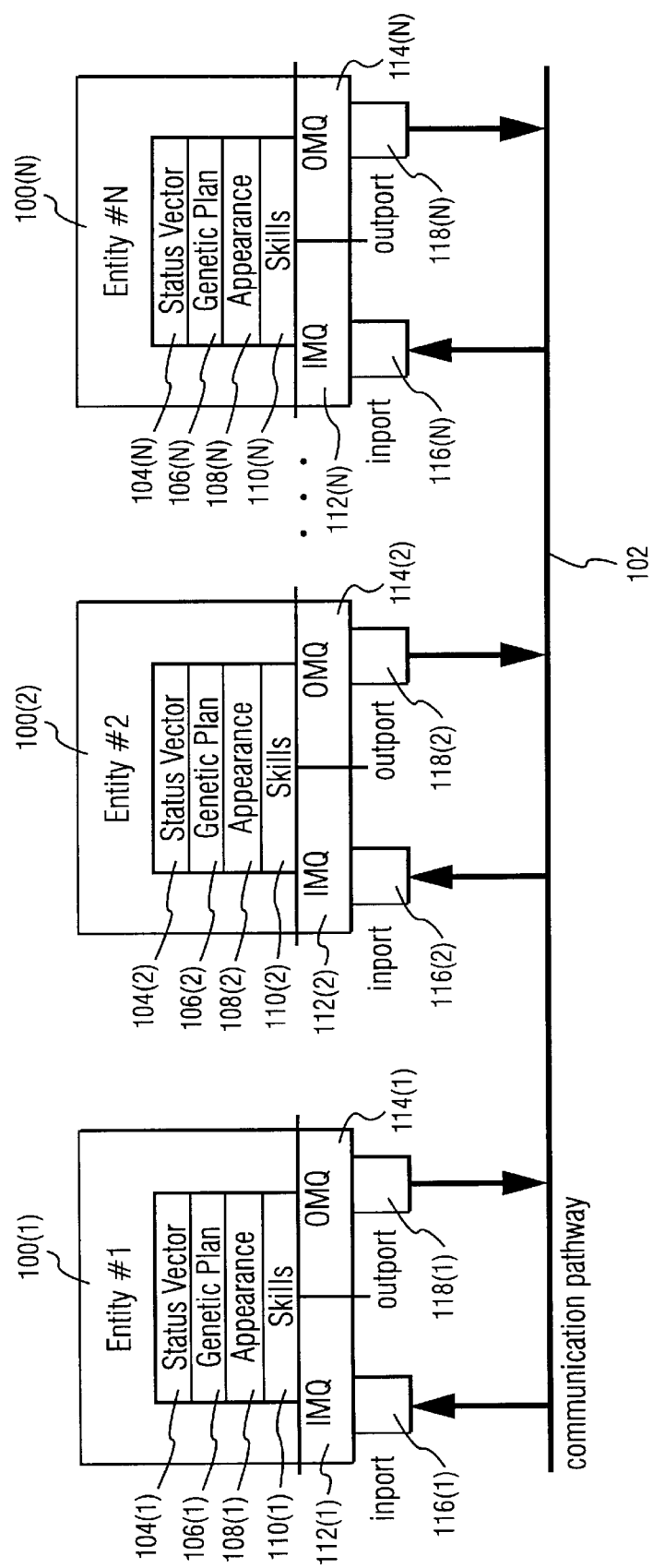
FIG. 2 is an example block diagram of simulation entities provided in accordance with the present invention, and how these simulation entities interact with each other via a communications pathway.

FIG. 2 shows an example collection of generalized entities 100 and how they interact with other entities via communications pathway 102. As one example, an entity 100(1) may be used to model cat 60 shown in FIG. 1, a second entity 100(2) may be used to model mouse 62, a third entity 100(3) may be used to model scene 64, etc. In this example, each entity 100 includes following components:

- a status vector 104 comprising a collection of items (e.g., <sv1, sv2, sv3, . . . , svN>) concerning the status of the entity;
- an incoming message queue (INQ) 112 providing a collection of messages (im1, im2, . . . , imN) originating from external sources (e.g., other entities) and communicated over communications pathway 102 to the entity via an input port 116;
- an outgoing message queue (ONQ) 114 providing a collection of messages (om1, om2, . . . , omN) the entity communicates via an output port 118 to the outside world (e.g., other entities) over communications pathway 102;
- a genetic plan 106 defining a set of rules determining the behavior of the entity;
- one or more appearance components 108 providing a list of display items specifying the appearance of the entity (e.g., geometry, list of parts, textures, bounding boxes, etc., which may be organized in a hierarchical tree); and
- a skills component 110 representing the physical motions (e.g., a list of animation sequences for basic moves) and any audio component associated with the entity.

In the preferred embodiment, some entities 100 can have multiple different appearance components 108 (referred to below as object classes). This allows an entity 100 to have several different appearances, and to transition from one appearance to another based on external stimuli. For example, a game character could appear as a human under certain conditions, as an eagle under other conditions, and as a tiger under still other conditions. The game character would be modeled as a single entity 100 having several different sets of appearance components 108 (i.e., object classes)—one for each of the different appearances, skill sets or behaviors.

Each entity 100 thus contains not only an input port 116 and an output port 118, but also its own genetic plan 106 describing the way it reacts to stimuli from the outside world. Since each entity 100 is responsible for its own operations, it may be executed as a separated process or even in a different processor. Entities 100 shown in FIG. 2 thus offer a distributed control mechanism where behaviors are genetically built into each simulation entity. Entities 100 support loose-coupled applications, and can be realized as a distributed system such as, for example, remote game play via the Internet or other communications medium (e.g., between two or more consoles 52 coupled together by telecommunications means).

Figure 2A:
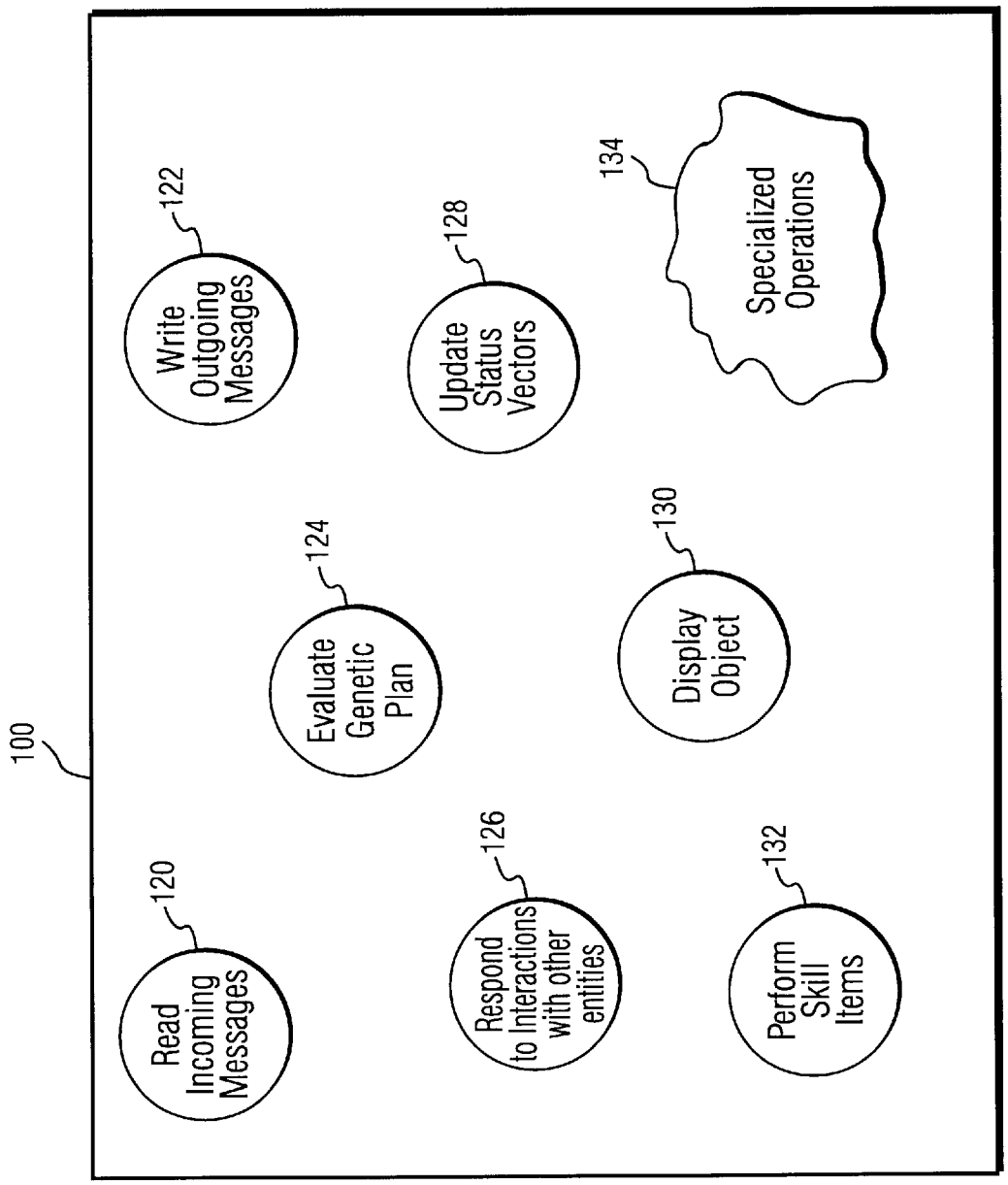
FIG. 2A is an example block diagram of example functions the FIG. 1 simulation entities are capable of performing.

FIG. 2A shows an example basic set of example operations each entity 100 is capable of performing. These basic operations may include, by way of non-limiting example:

reading incoming messages (120);

writing outgoing messages (122);

evaluating the entity's genetic plan (124);

responding to interactions with other entities (126);

updating status vectors (128);

displaying the entity (130); and performing skill items (132) (i.e., running animations, playing audio, etc.).

In addition to these generic functions, particular specialized entities may perform specialized functions 134 particular to those specific entities.

Class Hierarchy and Description

In accordance with a further aspect provided by the present invention, two separate class hierarchies are used to represent abstract components and physical components, respectively, of simulation entities 100:

entity classes 152; and object classes 202.

In the preferred embodiment, each entity has an associated entity class 152, and one or more than one object class 202. In the preferred embodiment, entity classes 152 define abstract characteristics of an entity 100 (e.g., behavior or generic plan, and communications). Object classes 202 define the physical characteristics of the entity (e.g., appearance or geometry, animation, etc.)

As mentioned above, the preferred embodiment allows a given entity 100 to have more than one associated object class 202—that is, two or more sets of alternative appearance, animation, or behavioral characteristics. Permitting an entity 100 to possess more than one set of object information allows the entity to change form (e.g., from a tiger to a bird) or perform multi-functionality during its lifetime.

Figure 3:
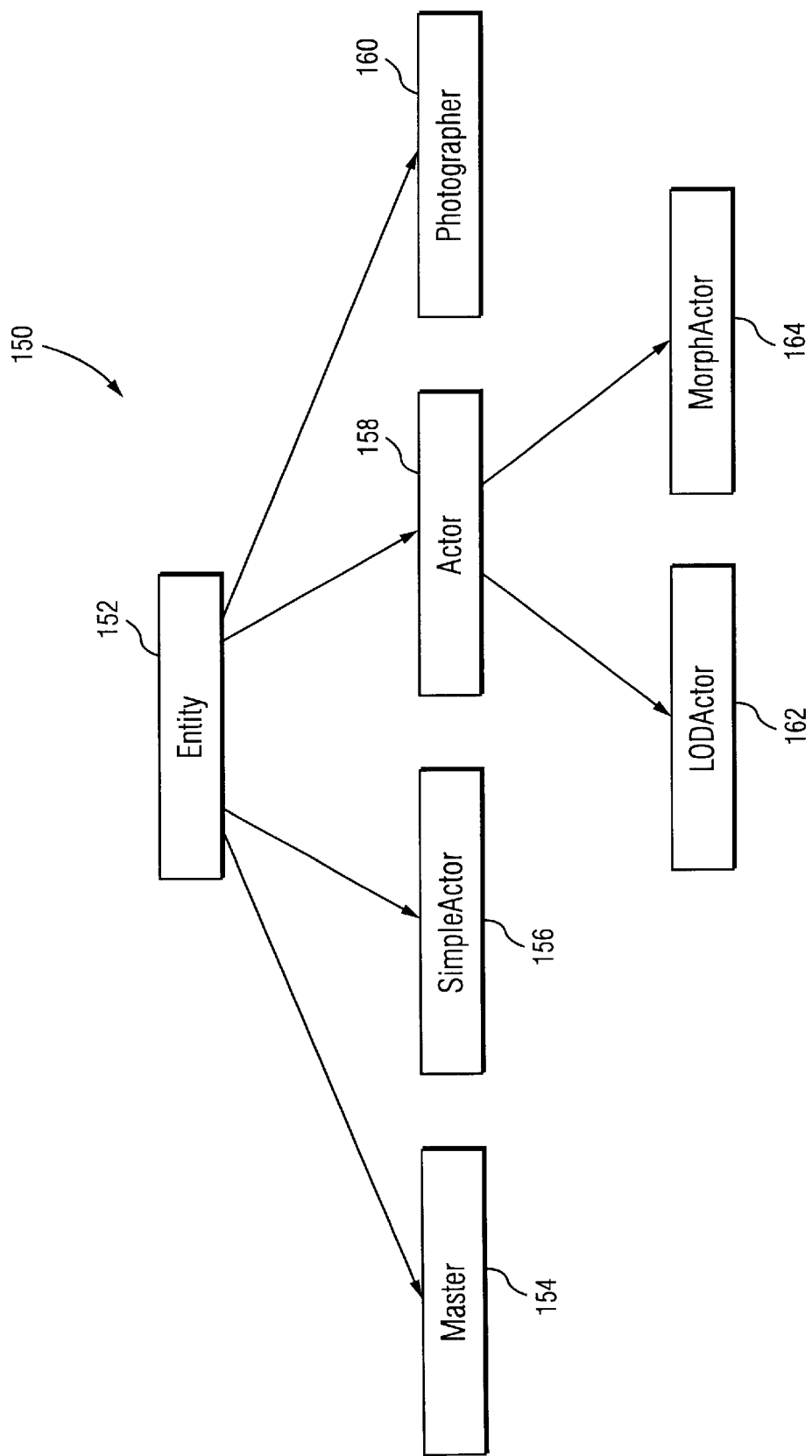
FIG. 3 shows an example entity class hierarchy.

The hierarchical tree diagram of FIG. 3 shows an entity class hierarchy 150 used to specify data structures and methods for behavior and communication. Entity class 152 shown at the top of FIG. 3 is the base class for all entities 100 in the preferred embodiment. Entity class 152 contains the data structures and method templates specifying the behaviors of an entity 100 as well as handling input queues 112 and output queues 114, and updating status vector 104. The following is an example pseudo-code definition for entity class 152:

Members: {geneticPlan, inputMsgQ, outputMsgQ}
Methods: {readInputMsg( )=0;
sentOutputMsg( )=0;
gpAction( )=0;
playGame( );}

This entity class 152 is an abstract class that serves as a template for the various entity subclasses 154–164. The various entity subclasses 154–164 shown in FIG. 3 are subclasses of the entity class 152, and thus inherit the properties of the entity class while possessing additional properties of their own. In one example, the entity class 152 is not itself instantiated, but rather is instantiated through one of its subclasses inheriting its template properties.

FIG. 3 further shows four different example entity subclasses:

master subclass 154, simple actor subclass 156, actor subclass 158, and photographer subclass 160.

In this example, master subclass 154 provides the high-level framework for the overall simulation controller provided by system 50. Master subclass 154 is thus the overarching organizational entity that coordinates between all other entities 100. For example, master subclass 154 is responsible for game control, camera operations and updates, actor and other object management (including the handling of messages between other entities), interaction/collision detection, and scene rendering. Master subclass 154 transitions from one state to the next based on its generic plan 106. By analogy to the film-making process, the master subclass 154 defines the producer or director—except that the master subclass 154 in the preferred embodiment is responsible for creating as well as directing the various actor processes and calling methods for each actor. Master subclass 154 may not itself have any explicit visual appearance, but may instead define how one views the other entities. The following is an example pseudo-code definition for master subclass 152:

Members: {actorTable, scene, camera, drawList}
Methods: {loadScene( );
drawScene( );
sendDrawList( );
detectCollision( );}

The photographer subclass 160 provides information and operations on a set of camera objects such as transformation, field-of-view angles, viewing ranges and geometry. In the preferred embodiment, the transformation defines camera's position and orientation; the field-of-view (FOV) of the preferred embodiment indicates the horizontal and vertical angles; and the viewing ranges of the preferred embodiment specify near and far clipping planes to determine the shape of camera's view volume. The geometry of the object is primarily used for the camera collision detection in the preferred embodiment.

Photographer subclass 160 provides a high-level framework of modeling a set of camera objects and basic camera operations (track—which simulates the camera flying through space along a preconstructed path, tether—which simulates a camera following a given object within a certain distance and at a certain angle, etc.). Referring once again to the film-making analogy, the photographer class 160 is the camera person, which controls whether a particular view is a close-up, a head shot, or a sweeping distance shot; the position the camera is placed relative to the scene and the actors, which actor or actors the camera follows at any given moment, etc. The genetic plan 106 of photographer class 160 may specify the behavior of camera objects (e.g., when to switch cameras, which actors to follow, etc.) Input and output queues 112, 114 are used to keep the photographer class 160 synchronized with other entities. The following is an example pseudo-code definition for photographer class 160:

Members: {cameraObjectTable, cameraParameterTable}
Methods: {selectCamera( );
tetherToObject( );
moveToLocation( );}

There are two different types of actor subclasses in this example class hierarchy 150: simple actors 156 and actors 158. Referring once again to the film-making analogy, actors 156, 158 can be the humans, animals, or other animated or other characters that act in the film.

Simple actor subclass 156 in this example categorizes a group of actor entities 100 that provide a single set of geometry and animations (i.e., a single set of appearance and skill characteristics). An instance of this subclass 156 thus does not change its "form" ("costume") during the entity's lifetime. Objects that are never far away from the camera may use this class. The leading role of many video games may be simulated using the simple actor subclass 156. Other examples include characters in fighting games and other "live" components that appear "indoors" within the scene. Simple actor subclass 156 provides efficient storage and execution, and is easy to understand and construct. The following is an example pseudo-code definition for simple actor subclass 156:

Members: {Object}
Methods: {gpAction( );
  playGame( );}

The more general, abstract actor subclass 158 in this example may have multiple sets of associated graphical representations and animation sequences. For example, in some simulations or video games, an entity 100 of actor subclass 158 may change its appearance, skills and/or behavior during play, and its form ("costume") may change during game play. All of those different forms may conceptually represent the same entity. Examples include moving objects with level-of-detail representations, "multi-personality" characters, and "morph" living beings. The following is an example pseudo-code definition for actor subclass 158:

Members: {RoleTable, currentRole}
Methods: {gpAction( );
  selectRole( )=0;
  playGame( );}

In the particular example shown, the actor subclass 158 has two associated hierarchical classes:

the level of detail ("LOD") actor class 162, and

Morph actor class 164.

These actor classes inherit all of the properties of the actor subclass 158, and have additional properties.

The level of detail actor class 162 is a special group of the actor subclass 158 that changes its visual representation and animation based on the distance to a in given point. It is a multi-actor that may change its "role" based on a distance between its location and a given point (e.g., a camera location, etc.). The level-of-detail class 162 may be used, for example, to allow an entity 100 to have a different appearance depending on how far away the entity is from the viewpoint. The following is an example pseudo-code definition for a level-of-detail class 162:

Members: {LODTable}
Methods: {gpAction( );
  selectRole( );}

The morph actor class 164 offers smooth transitions ("morphing") between different visual graphical representations based on conventional morphing algorithms. This multi-actor may transite its "roles" based on a specified algorithm (i.e., morph method, etc.). Different algorithms may be selected based on the entity's genetic plan 106. The following is an example pseudo-code definition for the morph actor class 164:

Members: {morphTable}
Methods: {gpAction( );
  selectRole( );}

Figure 4:
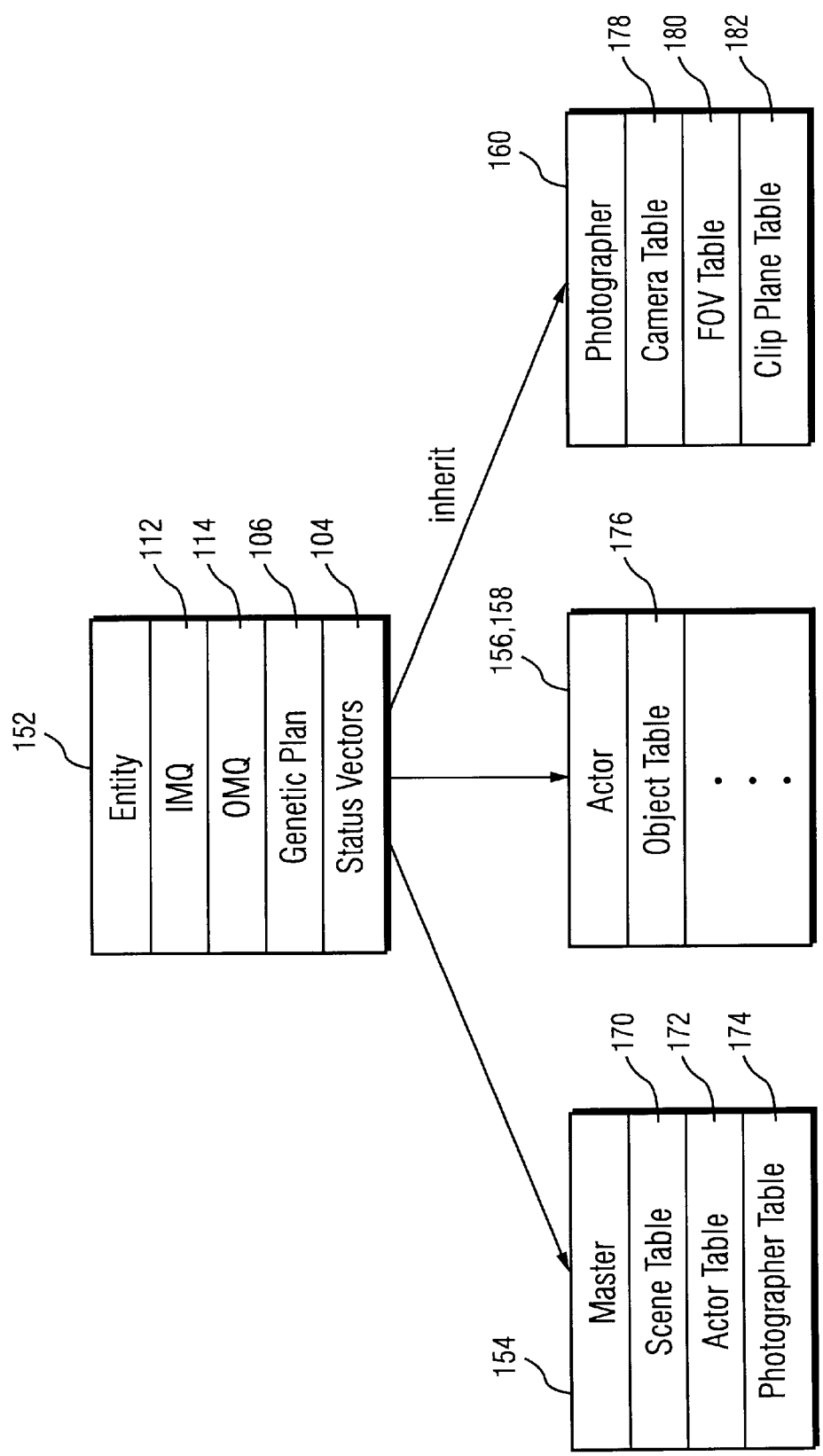
FIG. 4 shows a more detailed example entity class hierarchy.

FIG. 4 is a more detailed diagram of example entity class 152. As can be seen, entity class 152 includes an incoming message queue 12, an outgoing message queue 114, a genetic plan 106 and a status vector 104. A list of related audio files may also be included if desired. Each of classes 154, 156, 158, 160 inherits these characteristics of entity class 152, and also adds its own distinctive additional properties. For example, master class 154 may include a scene table 170, an actor table 172 and a photographer table 174. Scene table 170 indexes the various scenes to be presented by the simulation or animation. Actor table 172 references the various actor entities 156, 158. Photographer table 174 references the various photographer entities 160.

Each actor 156, 158 includes at least one object table 176 that references various object classes shown in FIG. 5 described below. In this example, the object table 176 of a simple actor class 156 references only a single object 202, whereas an actor 158 object table 176 may reference one or more such object classes.

Photographer class 160 may include a camera table 178 that references various cameras; a field of view table 180 that references various field of views; and a clip plane table 182 that references various clip plane definitions.

Figure 5:
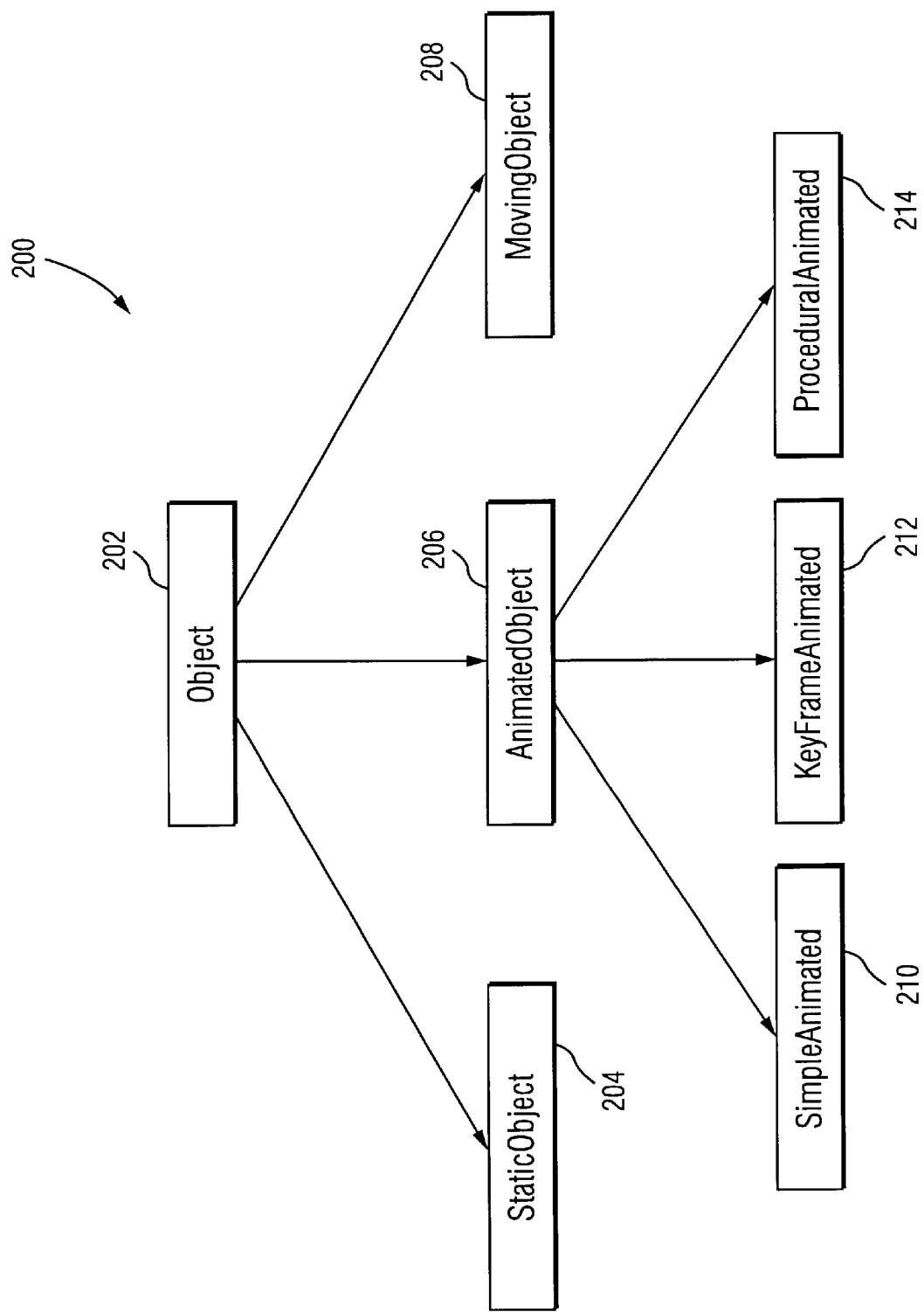
FIG. 5 shows an example object class hierarchy.

Referring now to FIG. 5, each entity 100 has one or more associated object classes 202 defining the physical characteristics of the entity (e.g., appearance or geometry, animation, etc.). In the preferred embodiment, object class 202 is a base class for all object classes, and contains a graphical representation (i.e., geometry and rendering information in the form of pre-compiled display lists with vertices, textures and rendering information), a collision table and an oriented bounding box. In the preferred embodiment, object class 202 is an abstract class that is not instantiated except through its subclasses. The following is an example pseudo-code definition for object class 202:

Members: {bodyPartsList, collisionTable}
Methods: {update( );
  getBoundingbox( );
  getCollisionTable( );}

The various object subclasses 204–214 inherit these properties of object class 202, and also include additional properties. As shown in FIG. 5, there are three basic classes of object class 202:

static object 204, animated object 206, and moving object 208.

In this example, static object class 204 represents non-environmental objects that have non-structured geometry and fixed location, size and orientation (e.g., a table, a monolith, a tree, etc.), but which may change appearance (color, shading, etc.). The following is an example pseudo-code definition for static object class 204:

Members: {drawFlags, transformation}
Methods: {updateDisplayFlags( );}

Moving object class 208 represents objects that travel with a specified velocity, acceleration, angular velocity and angular acceleration (e.g., a ball, a falling meteor, or a tethered camera). The following is an example pseudo-code definition for moving object class 208:

Members: {velocity, acceleration, destination}
Methods: {setParameters( );
  moveTo( );}

Animated object class 206 is used in the preferred embodiment to represent objects that change their location, orientation and size (e.g., humans, animals, etc.). As will be explained below, animated object class 206 in the preferred embodiment may provide a tree structure specifying a hierarchy of corresponding object parts (e.g., the head, torso, left leg, right leg, etc. of a human or animal). Each node in the tree stores information on a bounding box, current transformation, pointers to a corresponding graphical representation (e.g., display list), and an entry in an animation table. The following is an example pseudo-code definition for animated object class 206:

Members: {bodyStructure,}
Methods: {getPartsBoundingBox( );
  getPartsCollisionTable( );
  updateTransformation( );
  update( );}

The properties of animated object class 206 are inherited by each of three classes in the preferred embodiment:

simple animated object class 210,
key frame animated object class 212, and
procedural animated object class 214.

In the preferred embodiment, the simple animated object class 210 represents objects with animations controlled by a set of parameters that define (e.g., run-time) interpolation procedures. An animation table defined by this class 210 may contain entries for body parts in its hierarchy, each entry in the animation table having information on limitations and increment of size, location and orientation. Simple animated object class 210 can be used to model objects consisting of body parts with cyclical movements, for example. The following is an example pseudo-code definition of simple animated object class 210:

Members: {simpleAnimationTable}
Methods: {updateAnimation( );
  update( );}

Key frame animated class 212 represents animated objects pre-constructed as transformation matrices, or calculated by key frame interpolation procedures at run time (i.e., to have graphics system 52 generate frames in between start and end "key" frames based on interpolating between the start and end keyframes). One example application of key frame animated class 212 is to model a tracking camera. The following is an example pseudo-code definition of key frame animated class 212:

Members: {keyFrameAnimationTable}
Methods: {setCurrentAnimation( );
  updateAnimation( );
  update( );}

Procedural animated class 214 represents objects with animations controlled by analytical models based on physics or mathematics (e.g., particle animation). The following is an example pseudo-code definition of procedural animated class 214:

Members: {proceduralAnimationTable,
  animationProc}
Methods: {startAnimation( );
  updateAnimation( );
  updates;}

Although FIGS. 3 and 5 may appear to imply single inheritance, it is possible for a particular entity to inherit from multiple classes (i.e., to have multiple inheritance).

Example Entity Processing Steps

Figure 6:
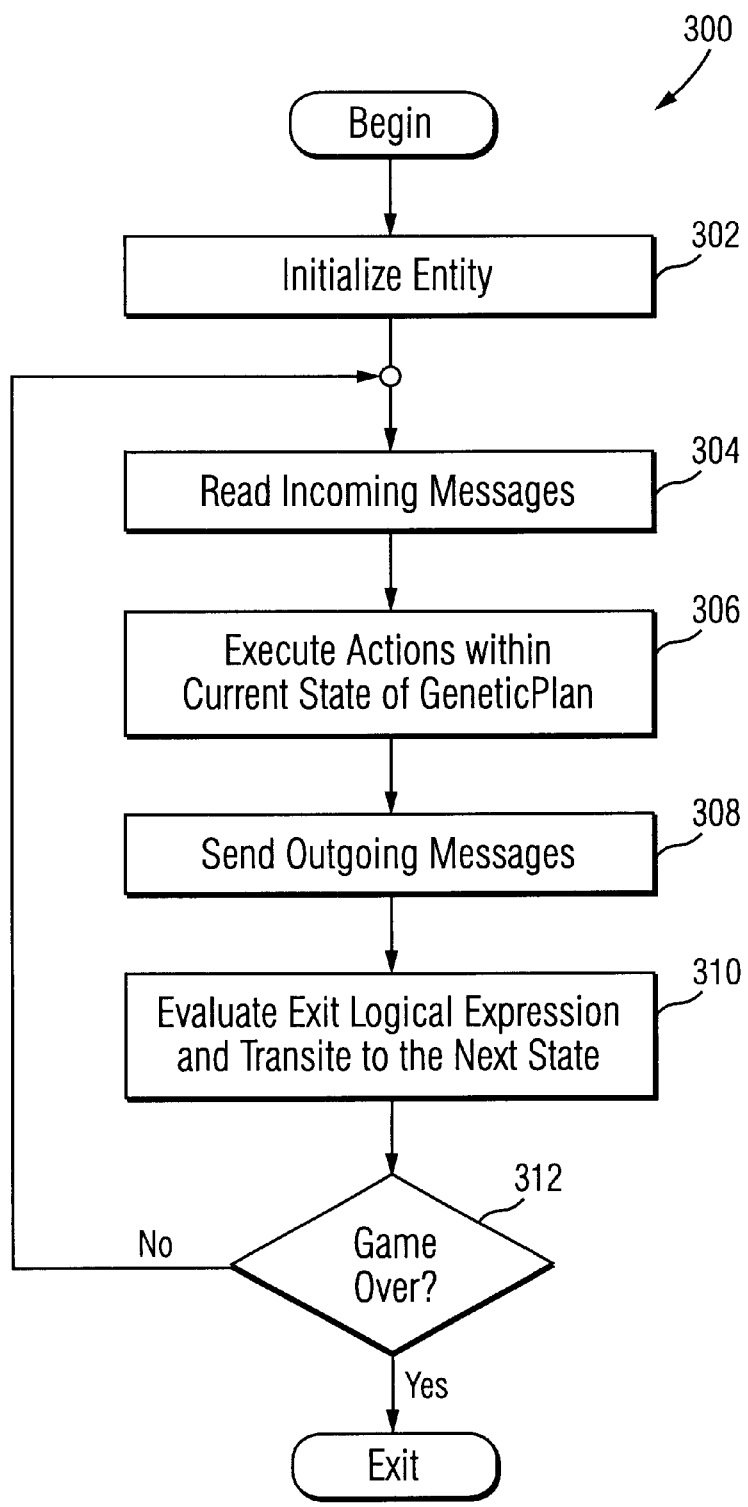
FIG. 6 shows example processing steps performed by an example generalized entity.

FIG. 6 shows an example overall flowchart of an example run time process 300 performed by an entity 100. In this example process 300, the entity 100 first is initialized (block 302), and then repetitively performs a loop comprising blocks 304, 306, 308, 310 until the game or simulation is over (or until the entity ceases to exist) (as tested for by decision block 312). Process 300 reads incoming messages (block 304) and, in response to externally applied stimuli contained within such messages, executes actions within the current state of the entity's own genetic plan 106 (block 306). Block 306 may include, for example, performing animation, playing audio, collision detection, etc., as well as updating status vector 104. Process 300 may also send outgoing messages (block 308). Process 300 may also evaluate logical expressions and transition to a next state if necessary (block 310). Blocks 306, 310 may be performed in accordance with a genetic plan 106 described above that determines and controls the behavior of an entity 100.

Figure 7:
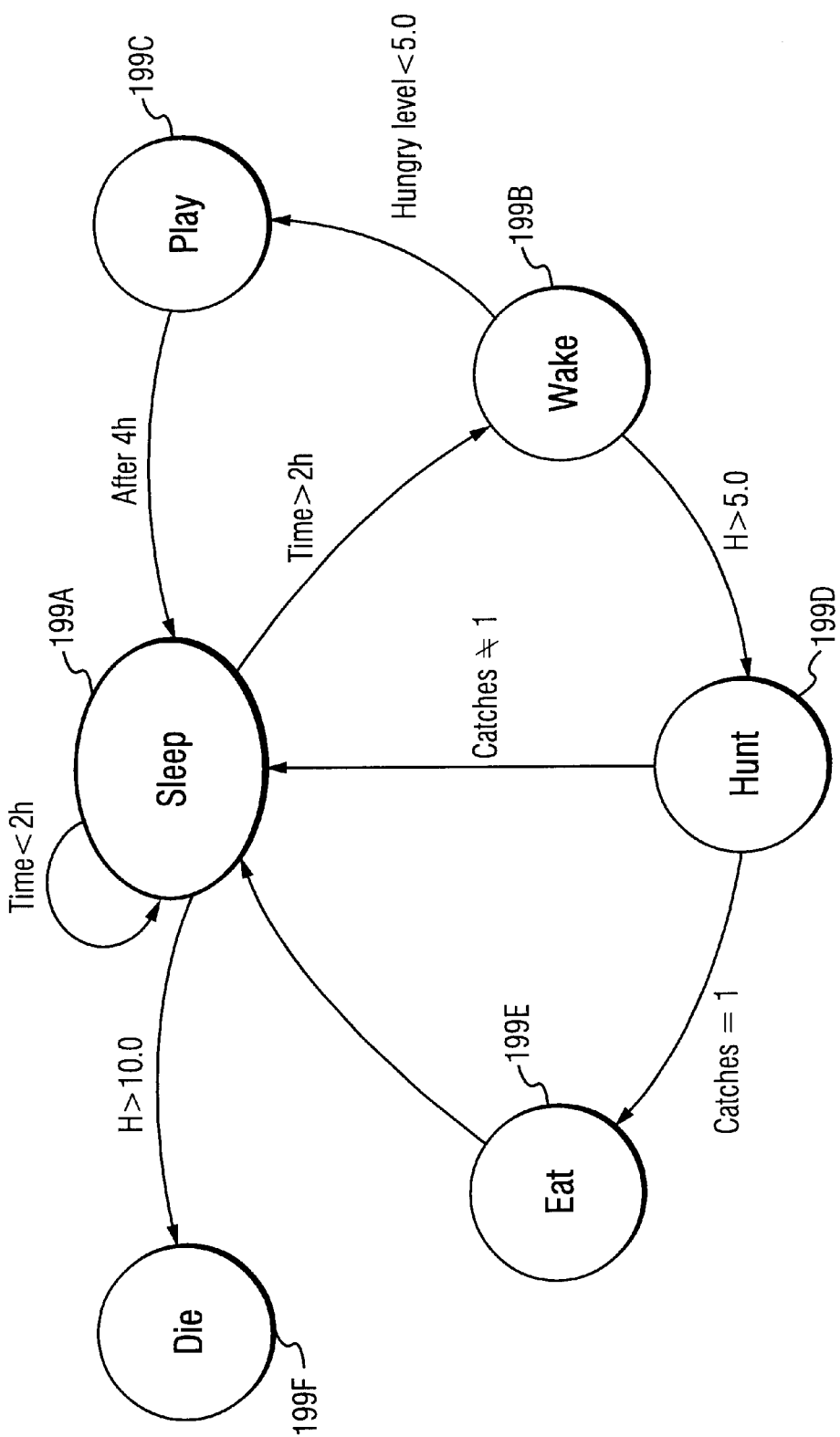

One example implementation of a genetic plan 106 is as a finite state machine. FIG. 7 shows an example finite state machine implementation of a genetic plan 106 for the cat 60 shown in FIG. 1. As shown in FIG. 7, the cat entity 60 transitions between various states (e.g., asleep state 199a, wake state 199b, play state 199c, hunt state 199d, eat state 199e and, if things go badly for the cat, a die state 199F) based on various external stimuli (e.g., the passage of time, whether or not the cat 60 is able to catch mouse 62, etc.). Each of states 199 shown in FIG. 7 may have particular animation sequences associated with them (e.g., to animate the cat entity 60 chasing a ball in the play state 199c, hunt the mouse 62 in the hunt state 199D, etc.). The various states 199 may have different object classes associated with them in the case of a generalized actor 158. The different states may also have different associated translation parameters, collision parameters (e.g., to test for collisions between the cat entity 60 and the mouse entity 62 in the hunt state 199D), and audio parameters (e.g., to cause the cat entity 60 to purr in the sleep state 199A, to cry in the hunt state 199D, etc.).

In the example shown, the cat entity 60 will remain in the asleep state 199A if it has been asleep for less than a certain amount of time, and will transition to the wake state 199B if more than that amount of time has passed. The cat entity 60 transitions from the wake state 199B to the play state 199C if a "hungry" variable is less than a certain threshold, and will remain in the play state 199C for a certain amount of time after which it will return to the sleep state 199A. If the "hungry" variable is more than the threshold, then the cat entity 60 will transition from the wake state 199B to the hunt state 199D where it will attempt to catch mouse 62.

If the cat entity 60 is successful in catching mouse 62, the cat entity will transition to the eat state 199E where it will eat the mouse; the "hungry" variable is reset in this instance, and the cat entity transitions back to the sleep state 199A when it is finished with its meal. If the cat entity 60 is unsuccessful in catching mouse 62, it will transition to the sleep state 199A and, if the "hungry" variable exceeds a second threshold, transition to the "die" state 199F.

FIG. 8A shows, in tabular form, the current state, action, exit logic expression and new state information for cat entity 60 that is shown graphically in FIG. 7. FIG. 8B shows similar information for mouse 62. In the preferred embodiment, genetic plan 106 referred to above may incorporate such a finite state machine to control the behavior of entity 100. These examples define finite state machines representing the entity 100's behavior, the state machines defining a collection of states S={s1, s2, s3, . . . } and a collection of transitions T={t1, t2, t3, . . . } between states, i.e., tk=<si, sj> wherein si and sj are in S. Each state si in S is associated with a set of procedures to perform, and at least one exit condition EC=[ec1:si1|ec2:si2| ... ] where ecj is a logical expression on the entity's status vector 104 and sik is a new state.

In addition, or alternatively to finite state machine implementations, techniques such as artificial intelligence, neural networks, adaptive resonant feedback loop technology, fuzzy logic, etc., may be used to define genetic plan 106 and thus control or affect the behavior of entity 100.

Figure 9:
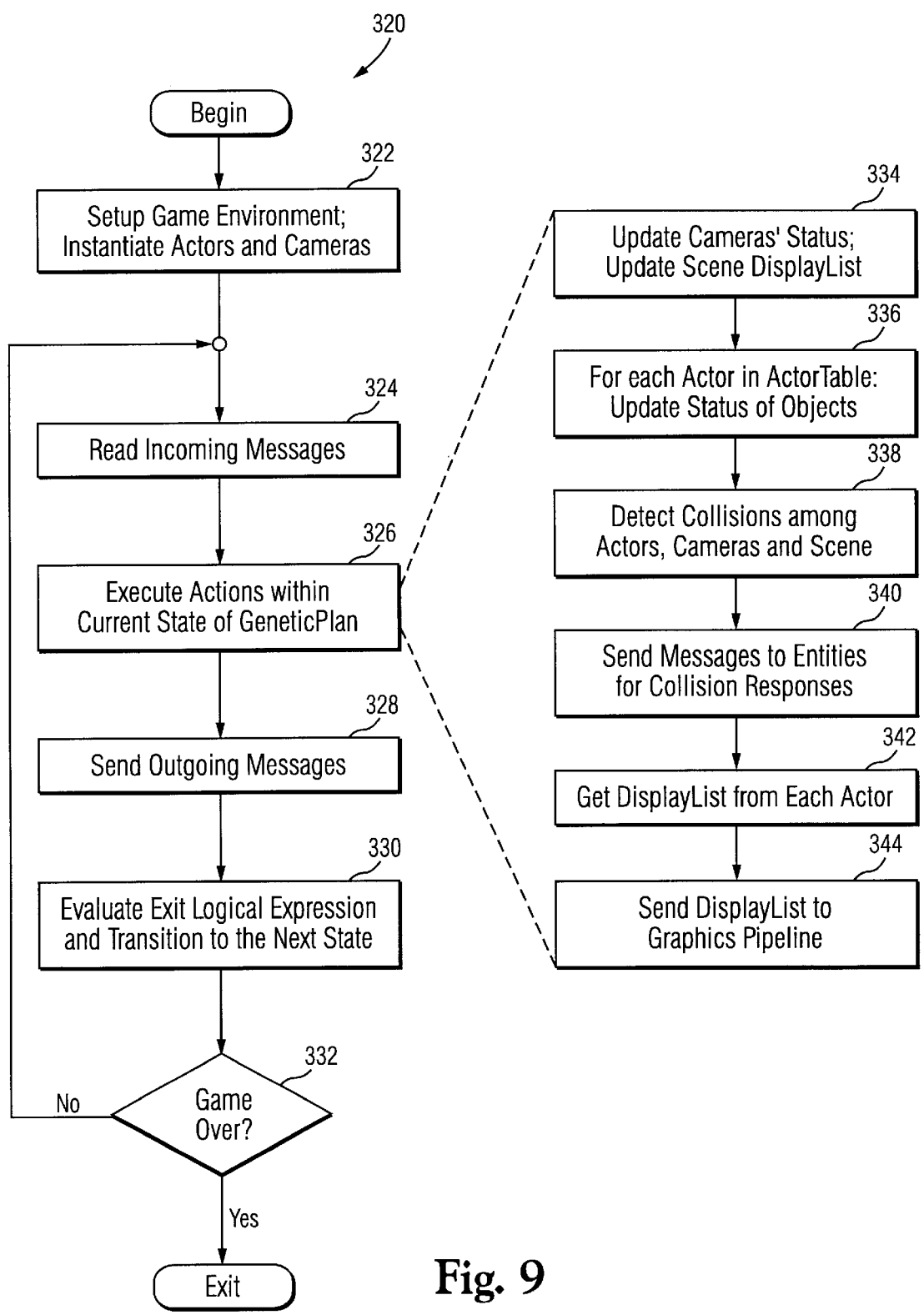
FIG. 9 shows example processing steps performed by an example master entity.

FIG. 9 is a flowchart of an example process 320 performed by master class 154. In this example, master class 154 is responsible for setting up the overall graphics environment and instantiating actors in cameras (block 322)— which it performs by creating various actor 156, 158 and photographer 160 entities as described above. Master 154 then enters a continual loop comprising blocks 324–330 which loop terminates upon a "game over" condition (as tested for by decision block 332). This loop reads incoming messages (block 324), executes actions within the current state of the genetic plan of the master 154 (block 326), sends outgoing messages 32 (block 328), and evaluates logical expressions and transitions to the next state (block 330)—in a manner that is generally similar to that shown in FIG. 6. However, because the entity 100 is a master 154, its "execute actions" block 326 involves coordinating action between all other entities 100 that are currently active and existing. Thus, for example, the master process 320 may involve updating the status of cameras and the scene display list (block 334); updating the status of all active objects for each actor in actor table 172 (block 336); detecting collisions among actors, cameras and the scene (block 338); sending collision messages to various entities 100 for collision responses (block 340); getting a display list from each active actor 156, 158 (block 342); and sending the final display list to the graphics pipeline of system 50 for rendering and display on a display device 58 (block 344). The following is pseudo-code implementing a simplified FIG. 9 process:

```
// int CMaster::playGame(void)
// {
//    setup game environment;
//    while(1) {
//       read input messages;
//       update all cameras;
//       execute GP actions based on current state;
//       send draw list to graphics pipeline;
//       send output messages;
//       Transit to a new state;
//    }
```

Figure 10:
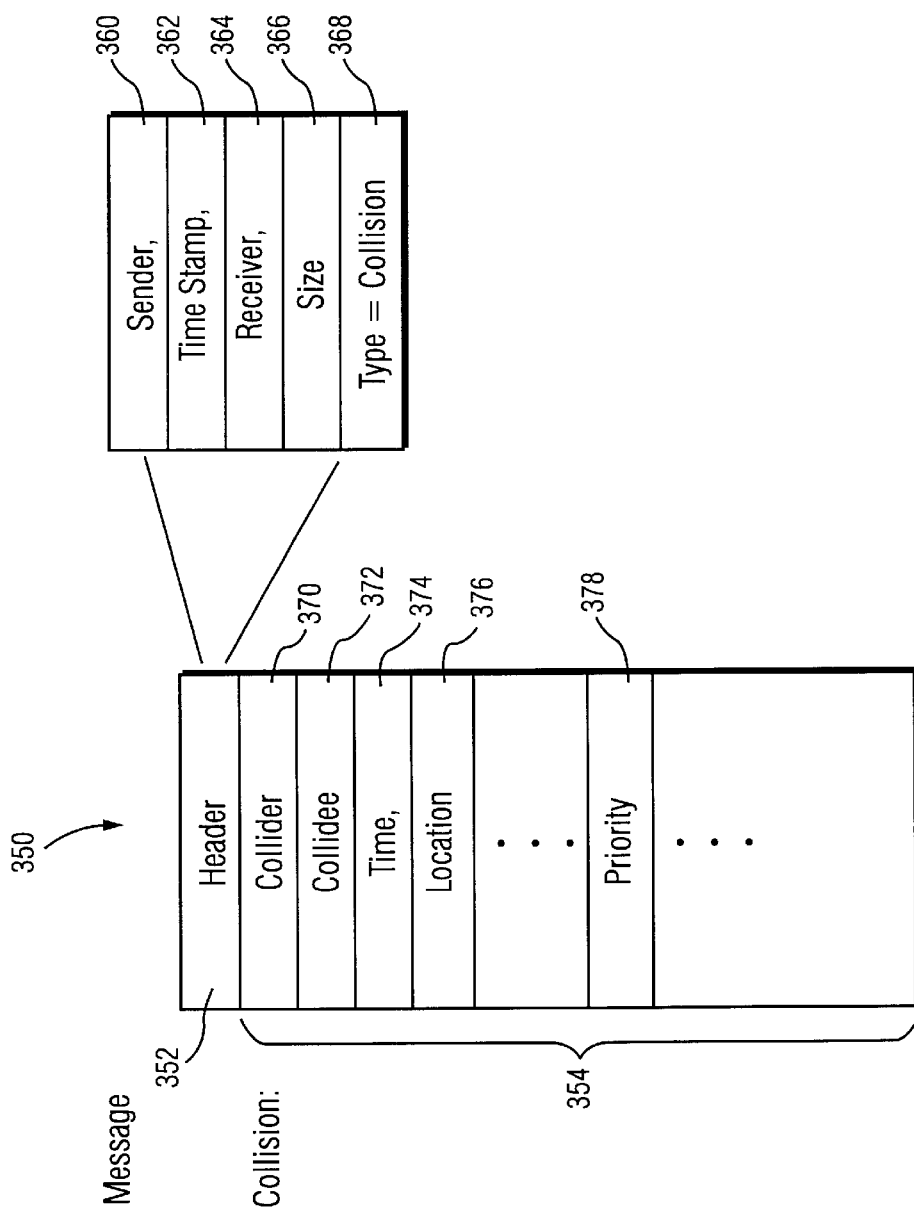
FIG. 10 shows an example collision message format.

FIG. 10 shows an example collision message 350 of the type that may be sent by FIG. 9, block 340. Message 340 may be sent over communication pathway 102 using a standard messaging protocol. Collision message 350 may include a header 352, and a message body 354. Header 352 may include message identification information such as, for example, identification of sender field 360, time stamp 362, identification of receiver field 364 (this field can designate a specific receiver, a number of receivers, or a designation that the message is to be broadcast to all receivers), size field 366, and message type (in this case, collision) field 368 (other message types include communication, inquiry/interrogation, dead reckoning, etc.). Message body 354 includes information pertaining to the collision being reported, e.g.:

identification of collider entity 100 field 370,
identification of collidee field 372,
time of collision field 374,
location of collision field 376, and
priority of collision field 378.

Example Data Structures Defining Entity 100

Figure 11:
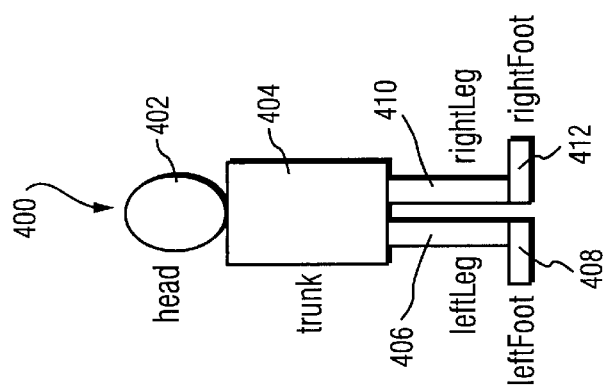
FIG. 11 shows an example character that may be hierarchically defined based on articulated body portions.

FIGS. 12–15 show example data structures that may be used to define entities 100 in the preferred embodiment. For purposes of illustration, these data structures are defined relative to an example simple human character 400 shown in FIG. 11 that includes a head 402, a trunk 404, a left leg 406 connected to a left foot 408, and a right leg 410 connected to a right foot 412. A similar diagram with six (or eight) articulated body parts may be developed for cat 60, mouse 62 or any other desired character to be displayed on display 58.

Figure 12:
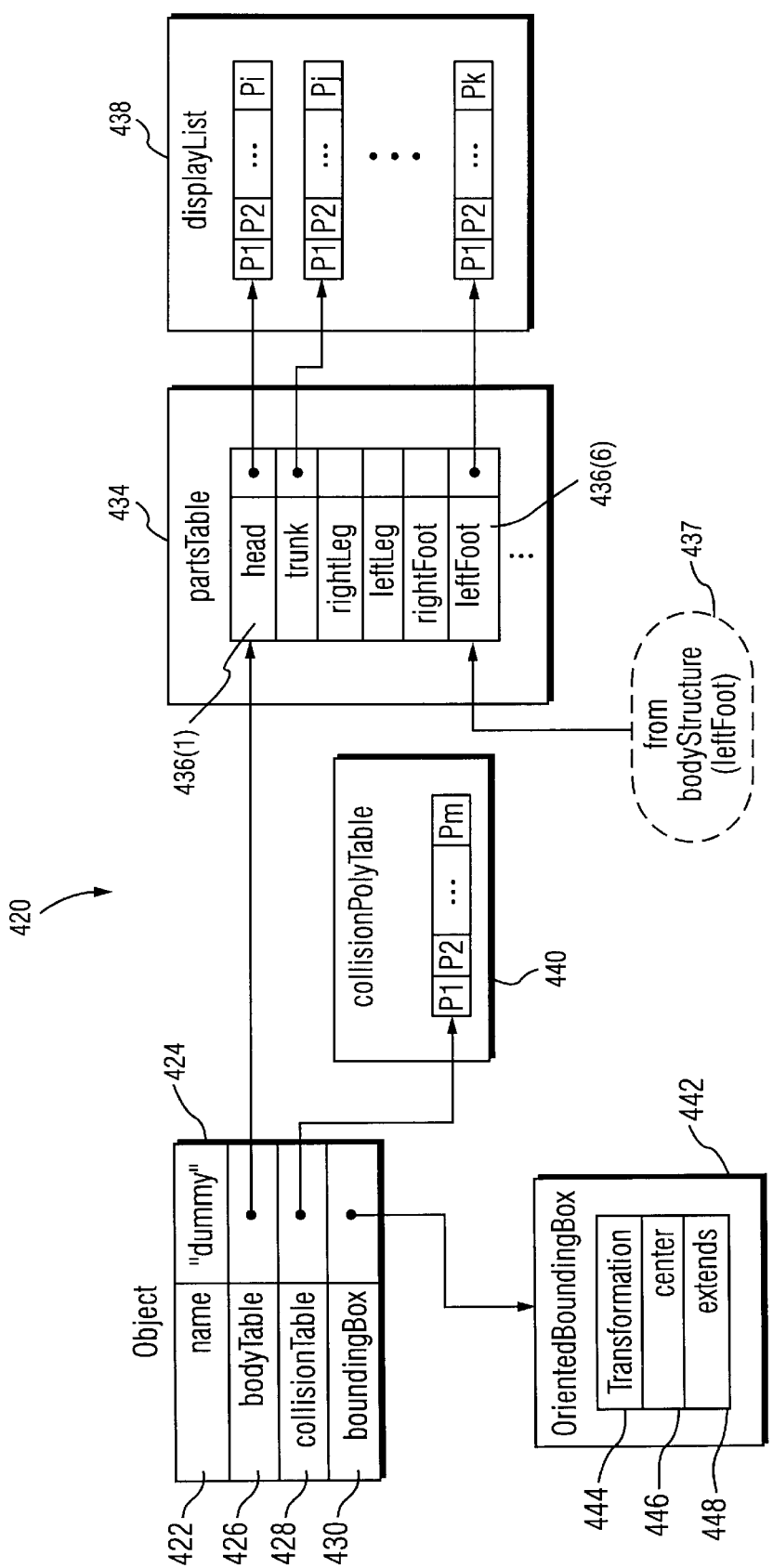
FIG. 12 shows an example data structure representing an object.

FIG. 12 is an example object data structure 420 defining the generic object class 202 shown in FIG. 5. Object data structure 420 includes an object data block 422 providing four components:

a name field 424,
a body table 426,
a collision table 428, and
a bounding box definition 430.

Name field 424 includes a name or other identification associated with the particular object for reference purposes. Body table 426 includes or refers to an hierarchical parts table 434 that includes a definition data block 436 for each of the hierarchical body parts of the object (in this case, with reference to FIG. 11, there are six articulated body parts defining the appearance of the object 400—but any number of body parts may be provided depending upon the complexity of the particular appearance being modeled). Parts table 434 includes or refers to display lists 438 corresponding to each one of the body parts modeled within the parts table. Each component 436 within parts table 434 may also refer to a component definition 437 of which it is an instance. Display lists 438 provide conventional polygon or other display list definitions of the physical appearance of each body part (e.g., vertices, textures, etc.), and in the preferred embodiment, control the 3-D graphics engine to render various body parts on display 58.

Object collision table 428 in this example includes or refers to a collision polytable 440 used for collision detection. Bounding box entry 430 includes or refers to an oriented bounding box data structure 442 including a transformation data block 444, a center data block 446 and an extends data block 448.

FIGS. 13A and 13B together are a schematic illustration of an example data structure for an animated object, i.e., for an actor 158 that may refer to a number of object classes 202. In this example, various body structures 437 as shown in FIG. 12 may be linked to the parts components 436 within parts table 434—and corresponding animation tables may be linked as well. In this particular FIGS. 13A & 13B example, a trunk body structure 450 is used to model the FIG. 11 articulated trunk 404 body part of objects 400. Trunk body structure 450 includes a corresponding bounding box data structure 442 including a transformation data block 444; a collision table 428; a body parts index 452 referring to a corresponding parts table 434 for the trunk; an animation index 454 referring to corresponding animation table 456; and a child node table 458 referring to one or more additional, connected body structures 450 for other parts of the overall object 400 being modeled. Thus, a particular body structure 450(1) may reference any number of additional body structures 450—each of which, in turn, may reference still additional body structures, and so on. This hierarchical representation is flexible in terms of both expandability and versatility. Each reference body structure 450(2), . . . 450(N) may include its own bounding box definition 452, transformation definition 444, collision table 428, body parts index 452 (referencing a corresponding parts table 434), animation index 454 (referencing corresponding animation table 456), and child node table 458 referencing any number (i.e., 0, 1, 2, etc.) of additional body structures 450.

FIG. 14 shows additional detail of a simple animation table 456. Animation table 456 may reference a parts animation list 460 including a number of parts animation data blocks 462. Parts animation data blocks 462 each include, in this example, a scale definition 464; a rotation definition 466; and a translation definition 468. Definitions 464, 466, 468 respectively define scale, rotation and translation parameters used to model animation of the corresponding object component. These definitions 464, 466, 468 may refer to corresponding parameters (including state and status values) within a parameter list 470. Such parameters may include, for example, a flag 472, a current value 474, a minimum value 476, a maximum value 478 and an increment function 480.

FIG. 15 shows an example key frame animated table which expands the simple animated table shown in FIG. 14 by providing key frame animation functionally. In the FIG. 15 example, an animation table 490 may define a number of different animation states (e.g., walk, run, jump). Each animation state defined within animation table 490 may refer to a different animation data block 492 each defining animation parameters for each component of the object 400 being modeled along with current frame and key frame table data. The current frame data 494 may indicate information about the current frame, while the key frame table 496 may refer to a key frame information table 498 providing a number of key frame defining data blocks 500 each including start frame data 502, number of frames data 504 and an interpolation function definition 506 used to provide interpolation between the start and end frames. Interpolation function definition 506 may, in turn, refer to entries in interpolation function table 508 including a number of interpolation function definitions (e.g., linear, slerp, Bspline, and others) selected based on the entity's genetic plan 106.

Example Authoring System

Figure 16:
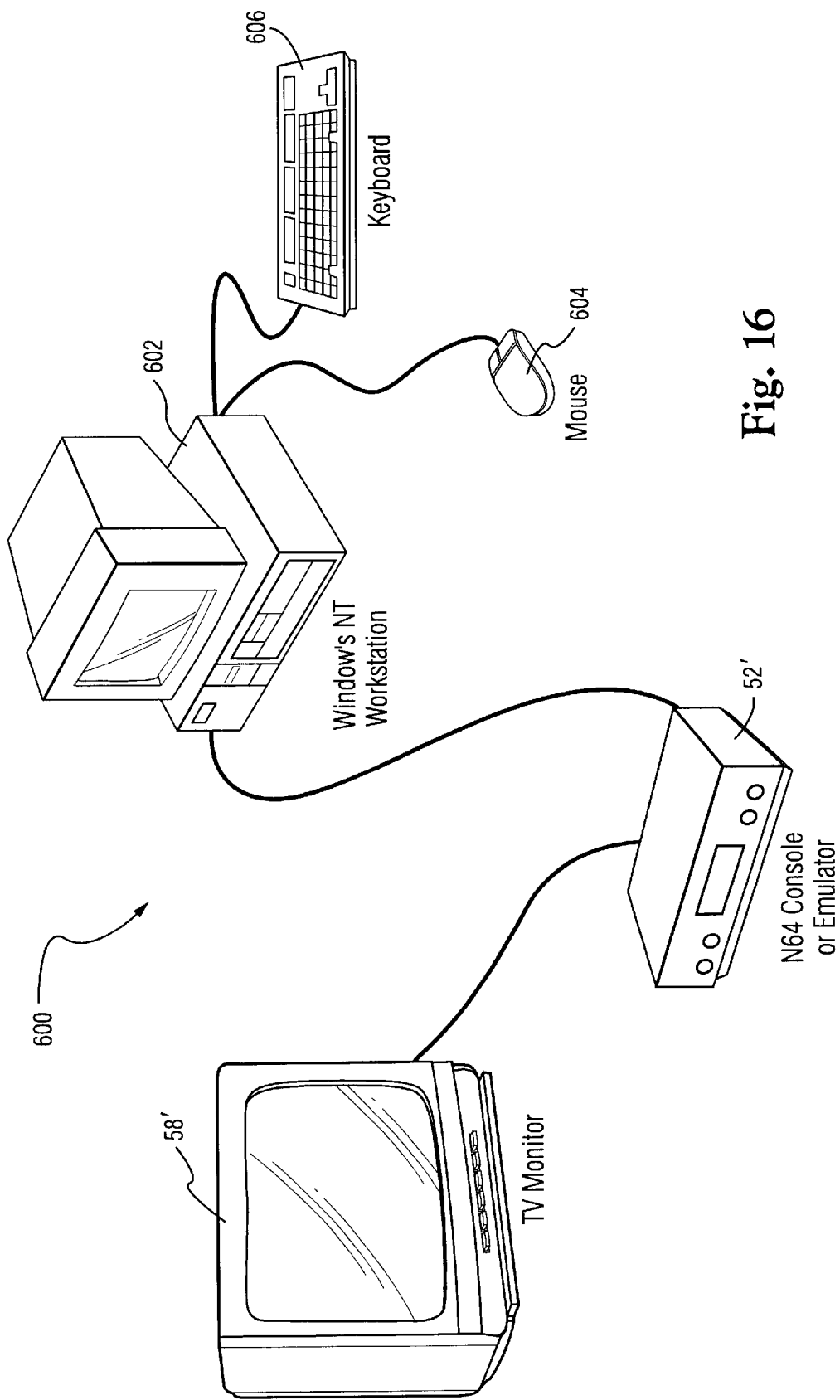
FIG. 16 shows an example authoring system.

FIG. 16 shows an example authoring system 600 for use in developing animations in accordance with the present invention. In this example, authoring system 600 includes a 3-D graphics platform 52' or emulator, a display device 58', and a workstation 602 including input devices such as a mouse pointing device 604 and a keyboard 606. Authoring system 600 provides a development environment for developing video game software to be placed in cartridge 56 or other storage media for execution on target platform 52 (see FIG. 1). Development system 600 organizes characters (e.g., cat 60, mouse 62 and scene 64) as entities 100, and game story lines are represented by entity genetic plans 106 as discussed above. Workstation 602 is used to develop the simulation/animation software, which may then be transmitted to the 3-D graphics system 52' (or emulator) for testing and play. Visual results are displayed on display device 58'.

Figure 17:
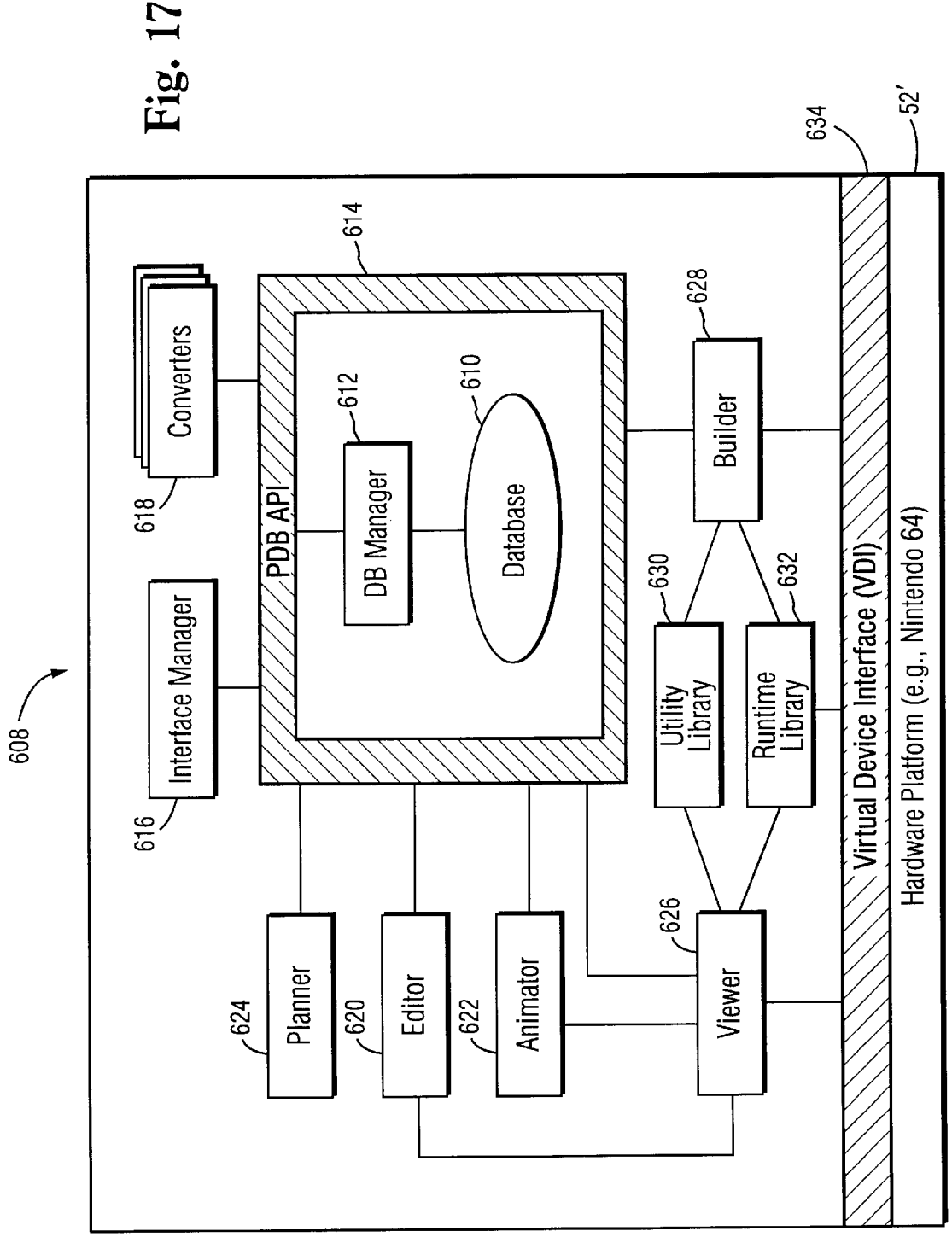
FIG. 17 shows an example authoring system software architecture.

FIG. 17 is a schematic diagram of the software architecture of the development environment 608 that executes on workstation 602. Development environment 608 includes a database 610 that is managed by a database manager 612 and communicated with via a database application programming interface (API) 614. Database 610 provides storage for entities 100 including status vectors 104, genetic plans 106, appearance data 108 and skill data 10 as well as the various data structure information shown in FIGS. 12–15. Database 610 may also include source and object trees, and may also maintain bookkeeping information. API 614 encapsulates the data items stored in database 610, and provides basic operations on those items. Database manager 612 provides data item exchange among various components within database 610, and controls the import and export of entity and object data.

In the FIG. 17 example, a number of elements communicate with the database API 614, including:

an interface manager 616,
a converter 618,
an editor 620,
an animator 622,
a planner 624,
a viewer 626, and
a builder 628.

Figure 19:
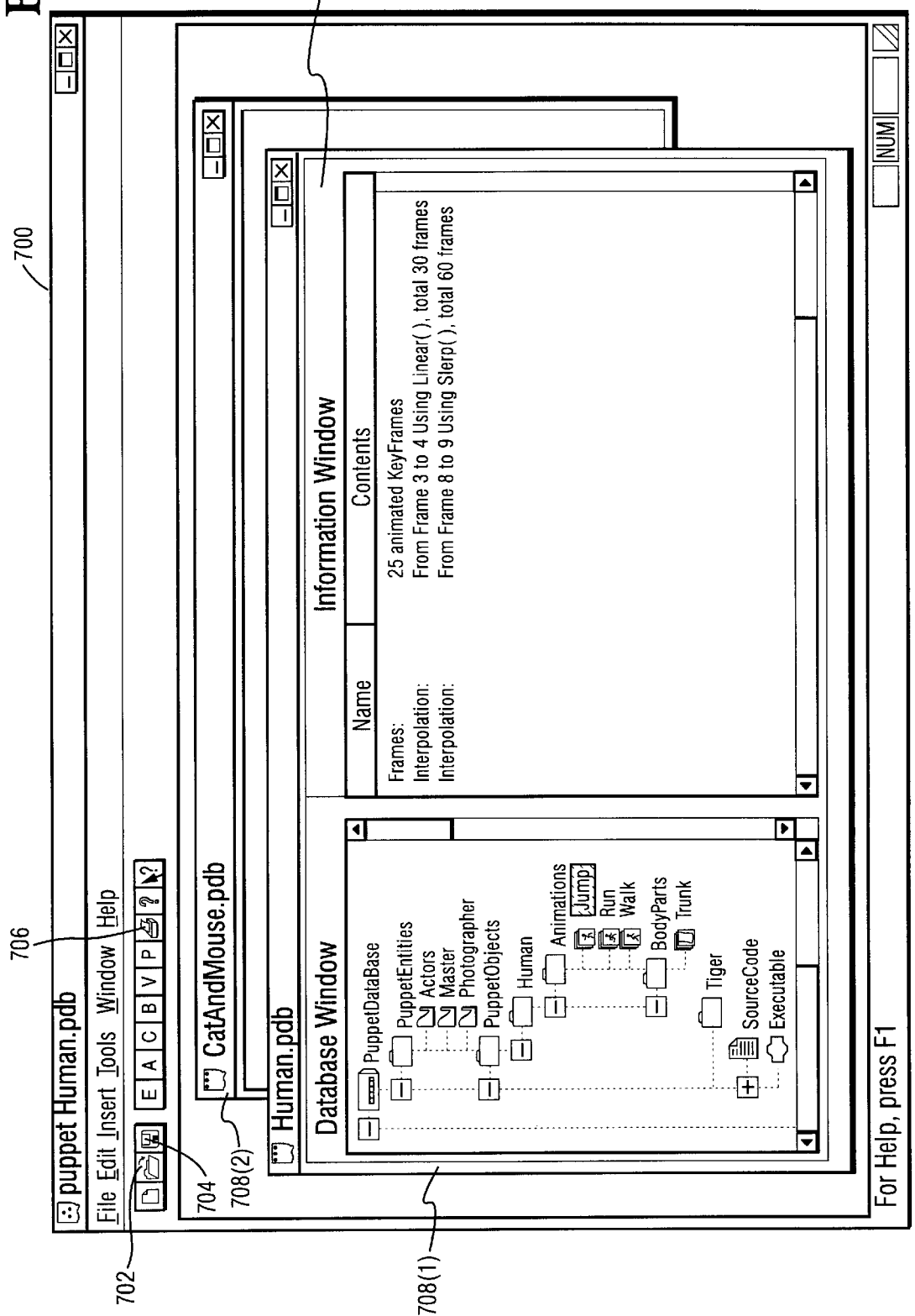
FIG. 19 shows an example main user interface for the FIG. 16 authoring system.

Interface manager 616 provides graphical user interface processing, providing toolbars, item highlight and selections, "drag and drop" operations, etc. An example user interface display provided by interface manager 616 is shown in FIG. 19.

Converter 618 reads and parses external object files, and converts external objects into objects defined within the framework of database 610. For example, it may be desirable to use image or other data defined in a different form, and to convert it into the modeling representations used in the preferred embodiment. Converter 618 performs these operations.

Editor 620 constructs and edits entities 100, providing such operations as duplicate, remove, modify, etc. Editor 620 may also be used for source code creation and editing.

Animator 622 edits and creates the animation tables shown in FIGS. 14 and 15, specifies key frame interpolation, forward and inverse kinematics, etc. Planner 624 creates and edits genetic plans 106, and may also perform syntax checking and run time code generation.

Viewer 626 provides 3-D object display on workstation 602, along with animation visualization. Builder 628 generates and edits run time code, performs compilation and link environment setup, and performs executable builds. Viewer 626 and builder 628 may access the utility library 630 and/or run time library 632. Utility library 630 provides basic utility support such as vector, matrix and quaternion calculations, 3-D transformation, messaging, internal clock, animation interpolation, dynamics and kinematic algorithms. Run time library 632 provides run time processing support such as display list preparation, rendering procedures, BSP tree traversal algorithms, etc.

Viewer 626, run time library 632 and builder 628 may interface with a virtual device interface (VDI) 634. Virtual device interface 634 provides hardware platform independent support. For example, virtual device interface 634 may allow the executable code generated by builder 628 to be executed on a number of target platforms including that shown in FIG. 1.

Figure 18:
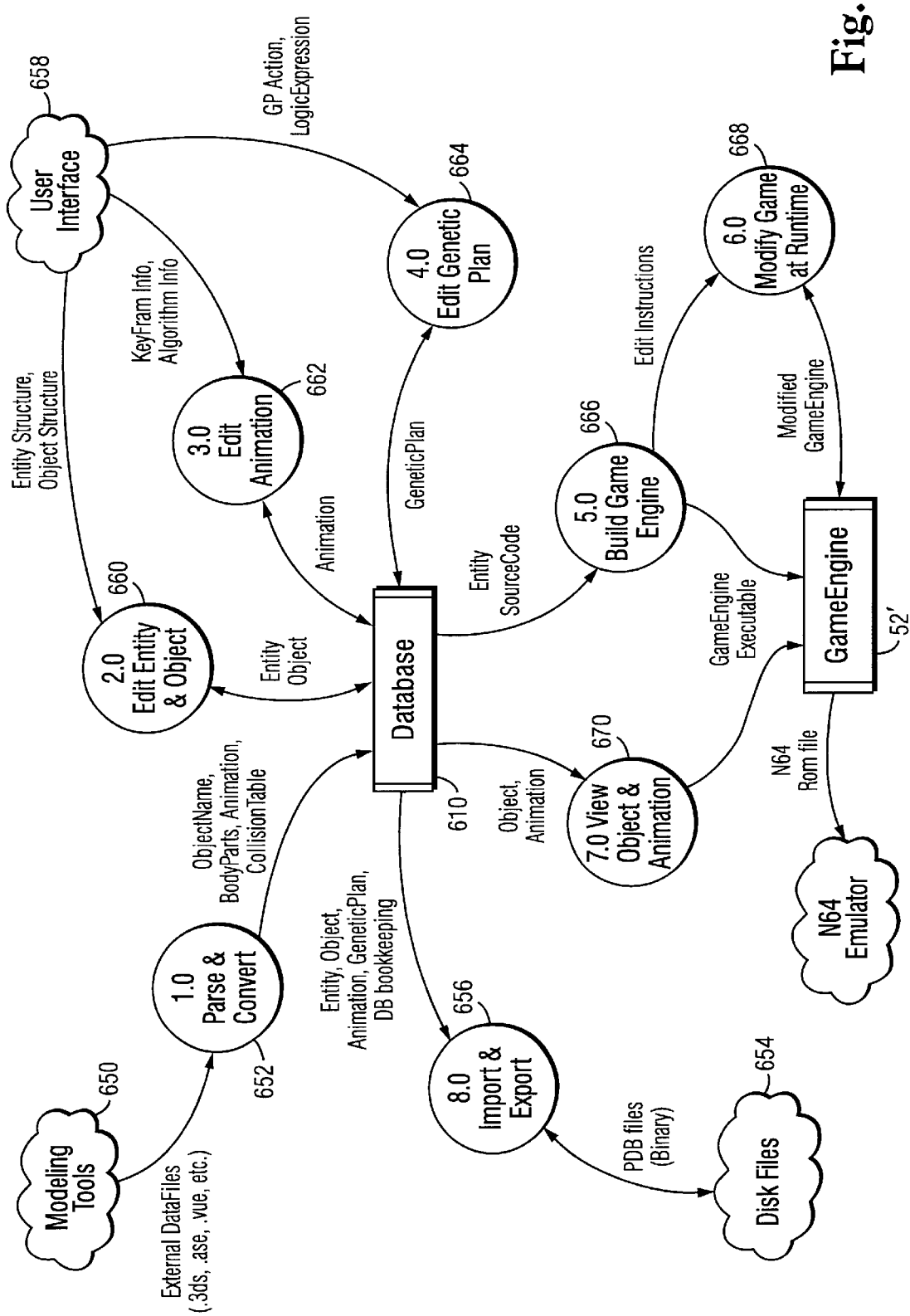
FIG. 18 shows example processing steps performed by the FIG. 16 authoring system.

FIG. 18 schematically illustrates the flow of information within the development environment 608. In this example, conventional modeling tools 650 may be used to create external data files in conventional formats, which converter 618 may parse and convert (block 652) for importation into database 610. Disk files 654 in "native" format for environment 608 may be imported and exported to and from database 610 (block 656). A user interface 658 provided by interface manager 616 allows users to edit entity and object structures (block 660) through use of editor 620. User interface 658 also allows users to edit animations via animator 622 (block 662). User interface 658 further allows users to interact with planner 624 to edit genetic plans (block 664).

Builder 628 is used to build game engine object code from entity source code from database 610 (block 666). Development environment 608 allows code to be modified at run time through edited instructions (block 668). View 626 allows users to view object and animation (block 670).

FIG. 19 shows an example main user interface 700 of development environment 608. This example user interface includes a variety of standard tools such as file open 702, file save 704, file print 706, etc. Interface 700 may further include a number of database windows 708 each providing a view into database 610. In the FIG. 19 example, there are two active windows, one pertaining to a "human" database or database sub-set 610, and another pertaining to a cat and mouse database or database sub-set. Each database window 708 may include a listing of the various entities 100 within the database (including all actor classes 156, 158; all master classes 154, and all photographer classes 160). Database window 708 may also include a display of all object classes 202 (which may be broken into a variety of categories such as human, animal, inanimate, etc.), along with corresponding animations (e.g., jump, run, walk) and associated body parts (e.g., trunk, left foot, right foot, etc.). Database window 708 may also display listings of source codes and executables within database 610. An information window 710 may provide information such as the number of animated key frames, and the type of interpolation being used for certain frames, as one example.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. In a home or portable video game playing system of the type including a processor programmed to play an animated game, a display, and user-manipulable controls allowing a user to interact with said play of said game, a method of providing real time computer simulation and/or animation display of at least one entity at least in part in response to said user interaction, comprising:
    representing said entity with a data structure comprising an entity class and at least one object class, said at least one object class defining plural alternative physical characteristic-defining components corresponding to plural different physical appearances of said entity, said entity class defining at least one behavioral characteristic-defining component modeling at least one behavioral characteristic associated with said entity, said data structure further including information defining a state associated with said entity;
    reading incoming messages pertaining to skid entity; and
    executing actions based on said behavioral characteristic and said reading step to provide animated game play;
    wherein a first of said plural alternative physical characteristic-defining components defines a humanoid appearance, and a second of said plural alternative physical characteristic-defining components defines an appearance other than a humanoid appearance.

2. A method as in claim 1 further including sending outgoing messages based at least in part on said executing step.

3. A method as in claim 1 further including modifying said state information to transition said entity to a next state.

4. A method as in claim 3 wherein said modifying step comprises determining said next state based on a finite state machine.

5. A method as in claim 3 wherein said modifying step comprises determining said next state based on at least one of artificial intelligence, neural networks, adaptive resonant feedback loop technology, and fuzzy logic.

6. A method as in claim 1 wherein said reading step comprises reading a collision message, and said executing step includes handling a collision condition based at least in part on said behavioral characteristic-defining component.

7. A method as in claim 1 wherein said executing step includes performing animation based on predetermined animation information provided by said behavioral characteristic-defining component.

8. A method as in claim 1 wherein said predetermined animation information comprises a hierarchically-defined parts animation list.

9. A home or portable video game playing system of the type including a processor programmed to play an animated game, a display, and user-manipulable controls allowing a user to interact with said play of said game, the system for providing real time computer simulation and/or animation display of at least one entity at least in part in response to said user interaction, comprising:
    a data storage element that stores at least one data structure representing said entity, said data structure comprising an entity class and at least one object class, said at least one object class defining plural alternative physical characteristic-defining components corresponding to plural different physical appearances of said entity; said entity class defining at least one behavioral characteristic-defining component modeling at least one behavioral characteristic, and information defining a state of said entity;
    a messaging facility that reads incoming messages pertaining to said entity; and
    an executor coupled to said message reading facility, said executor executing actions based on said behavioral characteristic and said state to provided animated game play;
    wherein a first of said plural alternative physical characteristic-defining components defines a humanoid appearance, and a second said plural alternative physical characteristic-defining components defines an appearance other than a humanoid appearance.

10. A system as in claim 9 wherein said messaging facility sends outgoing messages based at least in part on said executor.

11. A system as in claim 9 wherein said executor modifies said state information to transition said entity to a next state.

12. A system as in claim 11 wherein said executor determines said next state based on a finite state machine.

13. A system as in claim 11 wherein said executor determines said next state based on at least one of an artificial intelligence element, a neural network, an adaptive resonant feedback loop, and fuzzy logic.

14. A system as in claim 9 wherein said messaging facility reads a collision message, and said executor handles a collision condition based at least in part on said behavioral characteristic-defining component.

15. A system as in claim 9 wherein said executor performs animation based on predetermined animation information provided by said behavioral characteristic-defining component.

16. A system as in claim 15 wherein said predetermined animation information comprises a hierarchically-defined parts animation list.

17. For use with a home or portable video game playing system of the type including a processor programmed to play an animated game, a display, and user-manipulable controls allowing a user to interact with said play of said game, a data structure for use in generating a real time computer simulation and/or animation display based at least in part on said user interaction, said data structure comprising an entity class and at least one object class, said at least one object class defining:

plural alternative physical characteristic-defining components corresponding to plural different physical appearances of said entity; and said entity class defining at least one behavioral characteristic-defining component modeling at least one behavioral characteristic of said entity;

wherein a first of said plural alternative physical characteristic-defining components defines a humanoid appearance, and a second said plural alternative physical characteristic-defining components defines an appearance other than a humanoid appearance, and wherein said animated game play based on said data structure includes changing said entity between a humanoid appearance and other than said humanoid appearance.

18. A data structure as in claim 17 wherein said second plural alternative physical characteristic defining components defines an animal appearance.

19. A data structure as in claim 17 wherein said second said plural alternative physical characteristic defining components defines a non-sentient object appearance.

20. A data structure as in claim 19 wherein said data structure stores further information that controls transition between said plural different appearances based on external stimuli.

21. A data structure as in claim 17 wherein the behavioral characteristic defining component comprises a genetic plan.

22. A data structure as in claim 21 wherein said genetic plan defines a set of rules that determine the behavior of the entity.

23. A data structure as in claim 21 wherein said genetic plan includes code defining at least one finite state machine.

24. A data structure as in claim 21 wherein said genetic plan describes how the stimulation entity reacts to at least one external stimulus.

25. A data structure as in claim 17 wherein said physical characteristic-defining component comprises a list of display items specifying the appearance of the entity.

26. A data structure as in claim 17 wherein said physical characteristic-defining component includes at least one 3D polygon definition.

27. A data structure as in claim 17 wherein said physical characteristic-defining component includes a hierarchical tree data sub-structure.

28. A data structure as in claim 17 further including a communication facility.

29. A data structure as in claim 28 wherein said communications facility includes an input queue and an output queue.

30. A data structure as in claim 17 further including data representing status of said entity.

31. A data structure as in claim 17 wherein said physical characteristic-defining component corresponds to an object class, and said behavioral characteristic-defining component corresponds to an entity class.

32. A data structure as in claim 17 wherein said behavioral characteristic-defining component corresponds to at least one of the following entity classes:
(a) master subclass,
(b) simple actor subclass,
(c) actor subclass, or
(d) photographer subclass.

33. A data structure as in claim 17 wherein said physical characteristic-defining component corresponds to at least one of the following object classes:
(a) static object class,
(b) animated object class, and
(c) moving object class.

34. An animation authoring system comprising:

an editor that constructs and edits data structures for use in generating a real time computer simulation and/or animation display, said data structures each comprising an entity class and at least one object class, said at least one object class defining plural alternative physical characteristic-defining components corresponding to plural different physical appearances of said entity, and said entity class defines at least one behavioral characteristic-defining component modeling at least one behavioral characteristic of said entity;

an animator that creates animation tables for use in connection with said behavioral characteristic-defining component;

a viewer that provides animation visualization based on said animation tables; and a run time library that provides run time processing support, said runtime library adapted for use in connection with a home or portable video game playing system of the type including a processor programmed to play an animated game, a display, and user-manipulable controls allowing a user to interact with said play of said game; and wherein a first of said plural alternative physical characteristic-defining components defines a humanoid appearance, and a second said plural alternative physical characteristic-defining components defines an appearance other than a humanoid appearance.

35. An animation authoring system as in claim 17 further including a converter that converts data in other formats to at least portions of said data structures.

36. An object oriented real time 3D home or portable video game playing graphics system of the type including a processor programmed to play an animated game, a display, and user-manipulable controls allowing a user to interact with said play of said game, said system further comprising:

a storage device storing an object oriented data structure defining at least one 3D display object, said object oriented data structure inheriting at least one characteristic from at least one other object oriented data structure, said object oriented data structure defining behavioral and appearance characteristics of said 3D display object and including an entity class and at least one object class, said at least one object class defining plural alternative physical characteristic-defining components corresponding to plural different physical appearances of said entity;

a graphics engine operatively coupled to said storage device, said graphics engine rendering said 3D display object based at least in part on said object oriented data structure and said at least one characteristic inherited thereby; and a computation engine coupled to said storage device, said computation engine modifying said object oriented data structure at run time based at least in part on user interaction with said 3D computer graphics system to provide animated game play at least in part in response to user interaction;

wherein a first of said plural alternative physical characteristic-defining components defines a humanoid appearance, and a second said plural alternative physical characteristic-defining components defines an appearance other than a humanoid appearance.

37. A system as in claim 36 wherein said computation engine computes a next state associated with said display object based at least in part on said behavioral characteristic.

38. A system as in claim 36 wherein said data structure defines first and second alternative appearance characteristic-defining components, and said computation engine selects between said first and second alternative appearance characteristic-defining components based at least in part on said behavioral characteristic.

39. For use with a home or portable video game playing system of the type including a processor programmed to play an animated game, a display, and user-manipulable controls allowing a user to interact with said play of said game, a storage medium comprising:

a first storage area storing at least one data structure for use in generating a real time computer simulation and/or animation display, said data structure comprising an entity class and at least one object class, said at least one object class defining plural alternative physical characteristic-defining components corresponding to plural different physical appearances of said entity, and said entity class including at least one behavioral characteristic-defining component modeling at least one behavioral characteristic of said entity; and a second storage area storing executable code for use in processing said data structure and providing animated game play at least in part in response to user interaction;

wherein a first of said plural alternative physical characteristic-defining components defines a humanoid appearance, and a second said plural alternative physical characteristic-defining components defines an appearance other than a humanoid appearance.

* * * * *